United States Patent
Sekiguchi

(10) Patent No.: US 7,143,045 B2
(45) Date of Patent: Nov. 28, 2006

(54) DEVICE AND METHOD FOR OPERATING DEVICE FOR DATA ANALYSIS BASED ON DATA ASSOCIATED WITH WORDS

(75) Inventor: Minoru Sekiguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/246,637

(22) Filed: Sep. 19, 2002

(65) Prior Publication Data

US 2003/0018467 A1 Jan. 23, 2003

Related U.S. Application Data

(62) Division of application No. 09/185,550, filed on Nov. 4, 1998.

(30) Foreign Application Priority Data

Nov. 17, 1997 (JP) ................................. 9-314699
Feb. 27, 1998 (JP) ............................... 10-046625

(51) Int. Cl.
  *G10L 11/00* (2006.01)
(52) U.S. Cl. ................. 704/275; 704/1; 704/9; 704/231; 704/235; 715/812
(58) Field of Classification Search ............. 704/231, 704/257, 9, 275, 235, 1; 715/812
See application file for complete search history.

(56) References Cited

U.S. PATENT DOCUMENTS

| | | | | |
|---|---|---|---|---|
| 4,638,445 A | * | 1/1987 | Mattaboni | 364/513 |
| 4,827,520 A | * | 5/1989 | Zeinstra | 704/270 |
| 4,896,357 A | * | 1/1990 | Hatano et al. | 704/275 |
| 5,345,538 A | * | 9/1994 | Narayannan et al. | 395/2.84 |
| 5,384,892 A | * | 1/1995 | Strong | 704/255 |
| 5,388,198 A | * | 2/1995 | Layman et al. | 715/812 |
| 5,826,233 A | * | 10/1998 | Matsumoto | 704/275 |
| 5,852,801 A | * | 12/1998 | Hon et al. | 704/244 |
| 5,852,804 A | * | 12/1998 | Sako | 704/275 |
| 6,064,959 A | * | 5/2000 | Young et al. | 704/251 |
| 6,396,954 B1 | * | 5/2002 | Kondo | 382/224 |

* cited by examiner

*Primary Examiner*—Richemond Dorvil
*Assistant Examiner*—Lamont Spooner
(74) *Attorney, Agent, or Firm*—Staas & Halsey LLP

(57) ABSTRACT

The object of the present invention is to enable an apparatus to perform a status analysis indicated by sensor data of a device, etc. based on an expression in a natural language, and to enable an apparatus to operate a device, etc. by an instruction based on a natural language, using a data process technology for handling data with a word.

Data groups, which are obtained by directly classifying the input from sensor 1 or obtained after processing this input, are stored in a database 6, in which a word is attached to each of the data groups. On receiving a sensor input, a characteristic is extracted from the sensor input by a characteristic extractor unit 2, and then the sensor input is classified by a characteristic comparison/classification unit 3 using the database 6. If the sensor input does not belong to any of the data groups in the database 6, the sensor input is temporarily stored in a database 7 with no word. After that, a word is attached to each of the classified data groups in the database 7 by a word provision unit 5, and the data groups are stored in the database 6 with words.

9 Claims, 25 Drawing Sheets

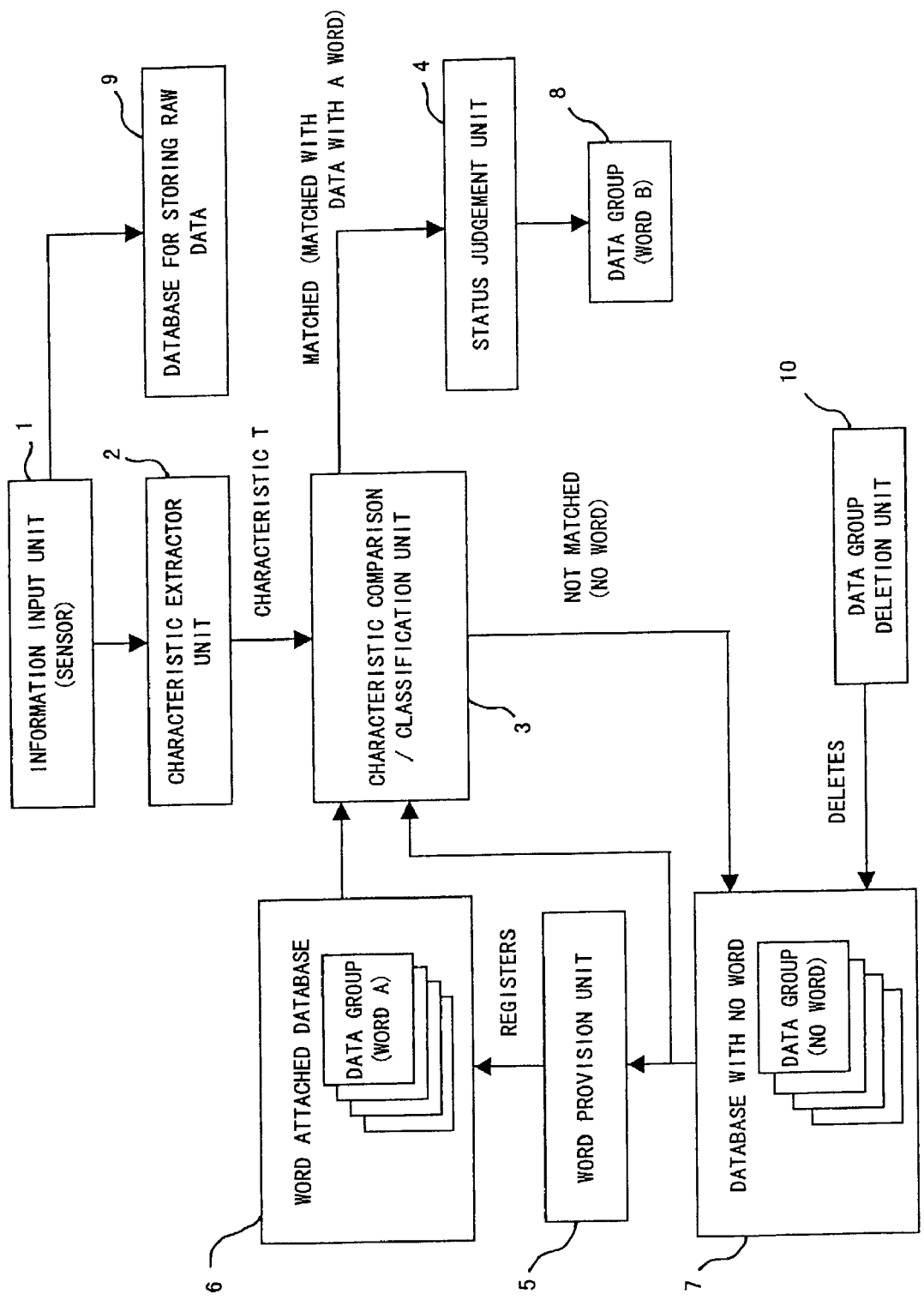
F I G. 1

| | 1 | 2 | 3 | 4 | 5 | 6 | 7 | 8 |
|---|---|---|---|---|---|---|---|---|
| A | 10.0 | 1.0 | 0.6 | 1.0 | 4.6 | 1.0 | 0.6 | 1.0 |
| B | 9.6 | 1.0 | 0.6 | 1.0 | 9.6 | 1.0 | 0.6 | 1.0 |
| C | 4.6 | 1.0 | 0.6 | 1.0 | 10.0 | 1.0 | 0.6 | 1.0 |

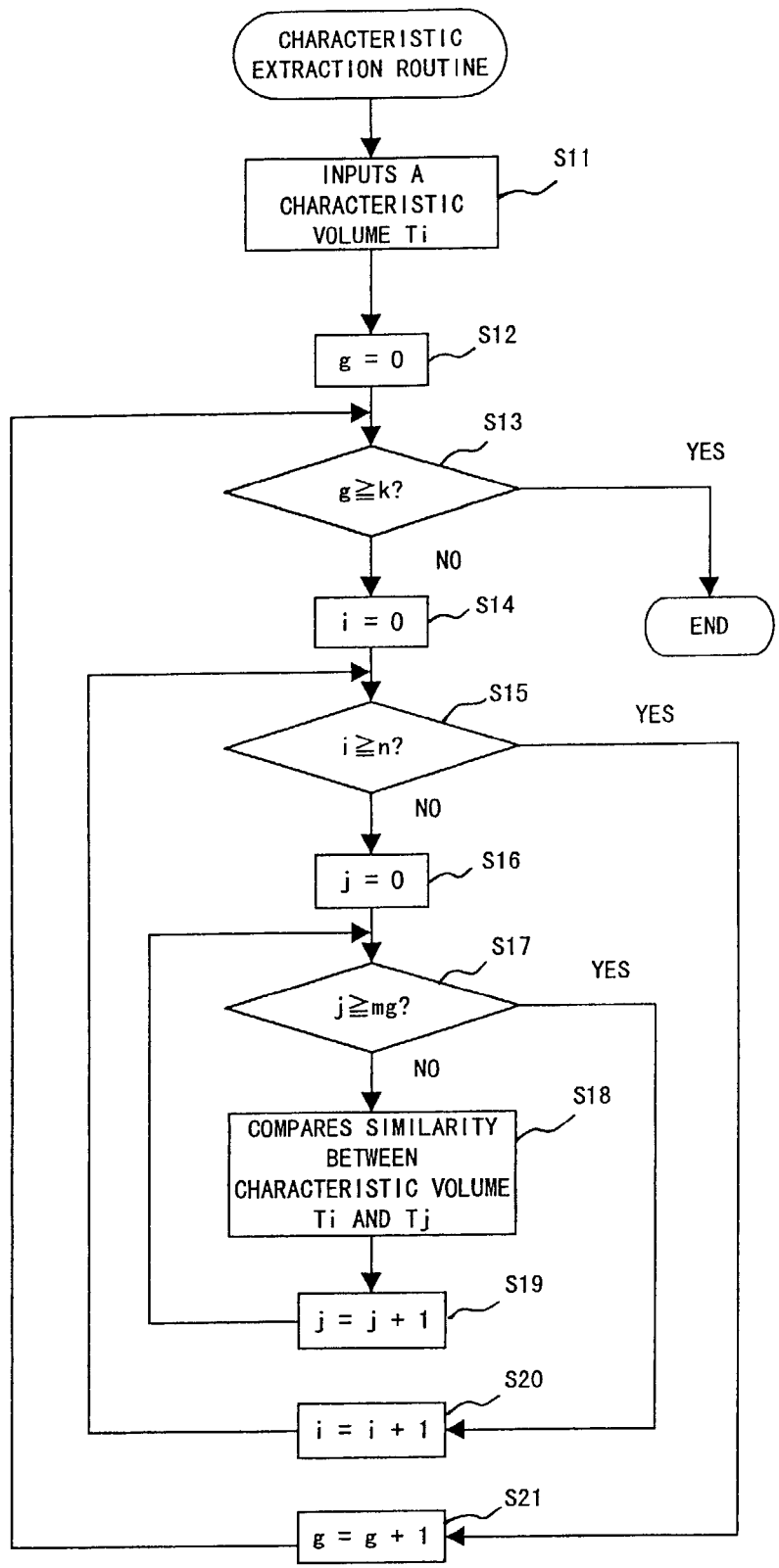
F I G. 9

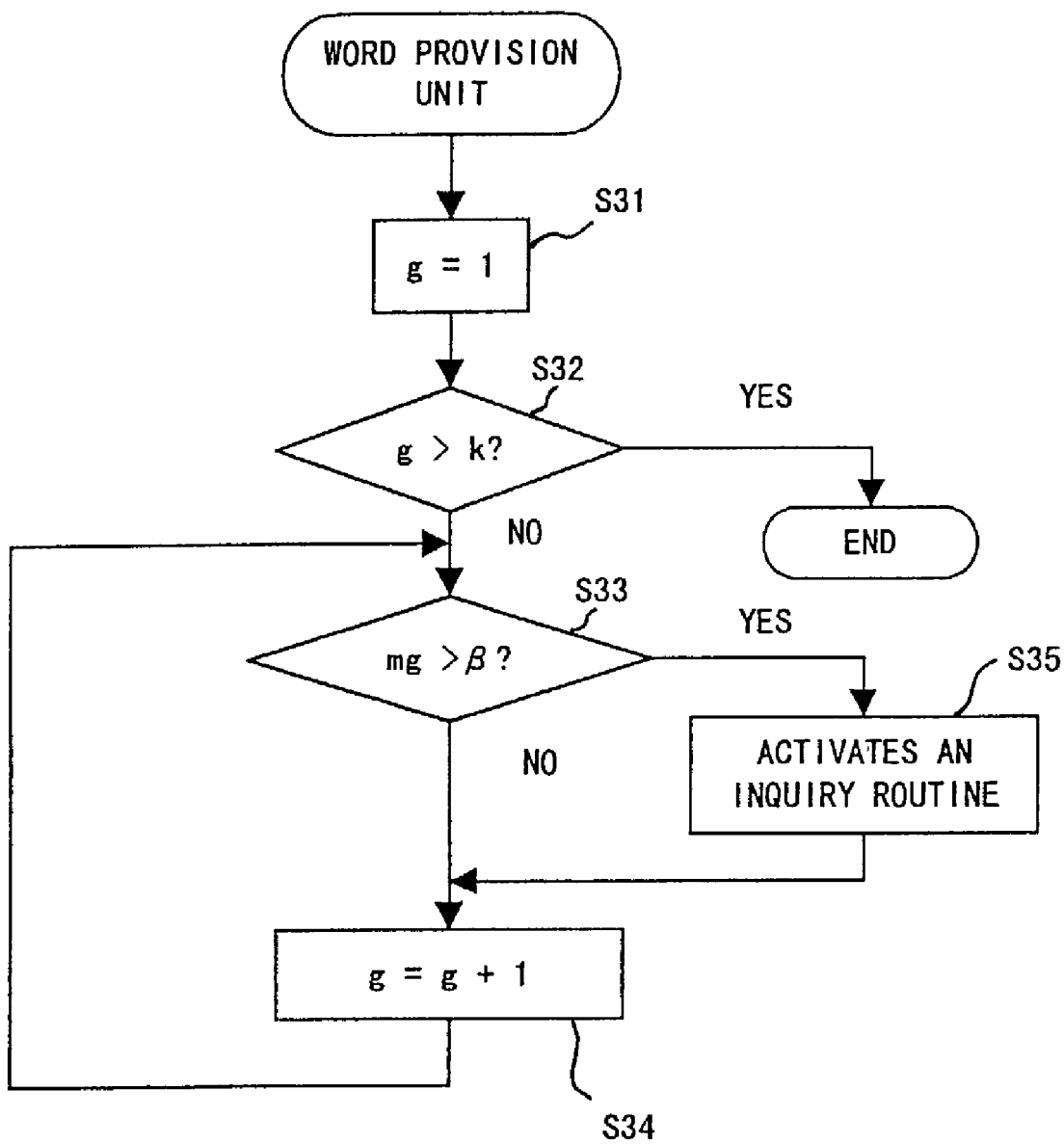
F I G. 1 0 A

| INQUIRY | DATA IN THE FOLLOWING LIST ARE OBTAINED. NAME THE DATA. |
|---|---|

| CONTENTS OF DATA | NUMBER OF DATA : 10<br>CONTENTS OF CHARACTERISTIC :<br>$\Delta\theta/\Delta t > 0$<br>DATA LIST :<br>  Data 1 : 10.0<br>  Data 2 : 11.0<br>  Data 3 : 12.0 |
|---|---|

WORD INPUT :

CATEGORY : _____
WORD : _____

RECOMMENDED :

CATEGORY : VERB
WORD : TURN

FIG. 11

```
AN EXAMPLE OF DATA OF A DATABASE FOR STORING RAW DATA:
ID: 0001                           (IDENTIFICATION NUMBER OF DATA)
TIME: 1990.11.11 10:00:00          (ACQUIRED TIME OF DATA)
SENSOR ID: US                      (KIND OF DATA)
DATA: 1.0 1.0 1.0 ......           (CONTENTS OF DATA)
CHARACTER: Ufr/Url                 (KIND OF CHARACTERISTIC VOLUME)
DATA: 16.0                         (CHARACTERISTIC VOLUME)
 . . . .
ID: 0002
 . . . .

IN THE CASE OF TIME SERIES DATA:

. . .                             (IDENTIFICATION NUMBER OF DATA)
ID: 000100                         (ACQUIRED TIME OF DATA)
TIME: 1990.11.11 10:00:00          (KIND OF DATA)
SENSOR ID: Theta                   (CONTENTS OF DATA)
DATA: 1.0.                         (KIND OF CHARACTERISTIC VOLUME)
CHARACTER: Delta-Theta/Delta-Time  (CHARACTERISTIC VOLUME)
DATA: 0.3(SID: 000099)
 . . . .
ID: 000101
```

FIG. 13

DATABASE WITH NO WORD ~7

```
UGID: 0001              (IDENTIFICATION NUMBER OF GROUP)
NUMBER: 5               (NUMBER OF DATA BELONGING TO A GROUP)
NAME: UNKNOWN1          (PROVISIONAL WORD ATTACHED TO A GROUP)
CATEGORY: UNKNOWN       (PROVISIONAL CATEGORY OF A WORD)
CHARACTER: Ufr/Url      (KIND OF CHARACTERISTIC VOLUME BEING A CRITERION)
DATA: >10.0             (CRITERIA)
ID: 0001,0003,0006,...  (IDENTIFICATION NUMBER OF DATA BELONG TO A GROUP)
UGID: 0002
. . . .
```

FIG. 14A

DATABASE WITH A WORD ~6

```
UGID: 0001              (IDENTIFICATION NUMBER OF GROUP)
NAME: CORRIDOR          (WORD ATTACHED TO A GROUP)
CATEGORY: NOUN          (CATEGORY OF A WORD)
NUMBER: 25              (NUMBER OF DATA BELONGING TO A GROUP)
CHARACTER: Ufr/Url      (KIND OF CHARACTERISTIC VOLUME BEING A CRITERION)
DATA: >10.0             (CRITERIA)
ID: 0001,0003,0006,...  (IDENTIFICATION NUMBER OF DATA BELONG TO A GROUP)
UGID: 0002
. . . .
```

FIG. 14B

| SENSOR NO.<br>NAME | 1 | 2 | 3 | 4 | 5 | 6 | 7 | 8 |
|---|---|---|---|---|---|---|---|---|
| (A) | 9.60 | 1.01 | 9.60 | 1.01 | 9.60 | 1.01 | 9.60 | 1.01 |
| (B) | 9.60 | 1.01 | 0.60 | 1.01 | 9.60 | 1.01 | 0.60 | 1.01 |
| (C) | 0.60 | 1.01 | 0.60 | 1.01 | 9.60 | 1.01 | 0.60 | 1.01 |
| (D) | 9.60 | 1.01 | 0.60 | 1.01 | 0.60 | 1.01 | 0.60 | 1.01 |
| (E) | 0.60 | 1.01 | 9.60 | 1.01 | 0.60 | 1.01 | 0.60 | 1.01 |
| (F) | 9.60 | 1.01 | 9.60 | 1.01 | 9.60 | 1.01 | 0.60 | 1.01 |
| (G) | 0.60 | 1.01 | 0.60 | 1.01 | 0.60 | 1.01 | 0.60 | 1.01 |
| (H) | 8.60 | 1.01 | 0.60 | 1.01 | 9.60 | 1.01 | 9.60 | 1.01 |
| (J) | 9.60 | 1.01 | 9.60 | 1.01 | 9.60 | 1.01 | 9.60 | 1.01 |
| (K) | 9.60 | 1.01 | 9.60 | 1.01 | 9.60 | 1.01 | 0.60 | 1.01 |
| (L) | 0.60 | 1.01 | 9.60 | 1.01 | 0.60 | 1.01 | 9.60 | 1.01 |
| (M) | 9.60 | 1.01 | 9.60 | 1.01 | 0.60 | 1.01 | 9.60 | 1.01 |

FIG. 17

LEARNING RESULT OF CHARACTERISTIC

| PROVISIONAL WORD | Unit 0 | Unit 1 | ERROR | DESCRIPTION |
|---|---|---|---|---|
| (A) | 0.36 | 0.77 | 0.20 | CROSSROADS |
| (B) | -0.39 | -0.88 | 0.20 | CORRIDOR |
| (C) | 0.26 | -0.98 | 0.20 | TO A BLIND ALLEY |
| (D) | -0.95 | -0.87 | 0.20 | FROM A BLIND ALLEY |
| (E) | 0.77 | -0.65 | 0.20 | TO A LEFT CORNER |
| (F) | -0.83 | 0.04 | 0.20 | FROM A LEFT CORNER |
| (G) | 0.86 | -0.20 | 0.20 | TO A RIGHT CORNER |
| (H) | -0.76 | 0.60 | 0.20 | FROM A RIGHT CORNER |
| (J) | 0.07 | 0.17 | 0.20 | RIGHT SPACE |
| (K) | -0.13 | -0.24 | 0.20 | LEFT SPACE |
| (L) | 0.97 | 0.81 | 0.20 | TO T-SHAPED JUNCTION |
| (M) | -0.13 | 0.95 | 0.20 | FROM T-SHAPED JUNCTION |

FIG. 19

RESULT OF CLASSIFICATION

● CHARACTERISTIC
◇ RESULT OF CLASSIFICATION

DEVICE AND METHOD FOR OPERATING DEVICE FOR DATA ANALYSIS BASED ON DATA ASSOCIATED WITH WORDS

This application is a Divisional application of application Ser. No. 09/185,550, filed Nov. 4, 1998, now pending.

BACKGROUND OF THE INVENTION

1. Field of the Invention

The present invention relates to a data process technology for processing data from a sensor used in a robot, etc. and a configuration technology for a language process interface used for providing instructions to a robot or a device, etc. from a user. In particular, the present invention relates to a method and apparatus for processing data with words (data to which words are attached), which provide the classification and storage methods for the sensor data and the usage method for the stored data for easily assessing the circumstances based on the sensor data, and further provide means for linking the human language to a behavior and operation of a robot, a data storing method thereof, and the usage method for the stored data.

2. Description of the Related Art

In a general sensor data processing method, a certain characteristic is extracted by performing a numerical process on the sensor data, and a next process method is determined or modified according to the characteristic. At this time, although a certain condition is assumed based on the characteristic value obtained from the sensor data and the next process method is determined, the condition is assumed only by a predetermined procedure because the characteristic, the value, and the classification expected in the next process are all predetermined.

Since a sensor used in a robot, etc. is a device for measuring a certain state or a change of this state, it is desirable to be able to correctly judge the status and state of the location from the obtained sensor data. However, since, generally speaking, the amount of data from a sensor is enormous, and in most cases the sensor data may include errors due to noise, etc., it is very difficult to make a simple status judgement based on a list of numerical values of the sensor data.

On the other hand, generally speaking in a command provided for operating a device such as a robot, etc., the speed or the location of the robot is directly designated by a numerical value, such as a command to operate at a speed of 1 m/sec., to rotate at 1 rad./sec., or to move to a location (100, 200). In electric home appliances such as an air conditioner, etc., there are only such setting commands as for setting a temperature to 20 degrees, setting the air conditioner to a "dry mode", "sleep mode", etc. based on predetermined setting values.

However, when one man gives an instruction to another man, an instruction is not given like this. An instruction which is given from one man to another is usually an abstract instruction, simply like "Walk!" or "Walk faster!", in which the speed or the angle of the legs are not specified. In electric home appliances such as an air conditioner, etc. saying "Higher temperature!" or "Cooler!" is more natural than designating a numerical value such as 20 degrees.

If an instruction can be given to devices such as a robot, air conditioner, etc. using these expressions, it can be expected to provide a more natural interface between a man and a machine.

In addition, there is a problem in the case where an instruction is given to a machine using natural words like these, in that an instruction to increase a temperature varies depending on the person issuing the command. For example, one person may say "Higher temperature!", but another person may say "Raise the temperature!". "Warmer!" can also be used with the same meaning.

Conventionally, since in order to solve this problem a variety of types of instructions are anticipated, listed, and stored, configuring a system for understanding commands like these requires a lot of work and an enormous memory capacity, and therefore is not practical.

In other words, conventionally, since there is no means for learning and storing the specific meanings of the commands "Warmer!", "Walk!", etc., a system which can flexibly respond to these commands has not been realized.

As described above, although a certain kind of state and a change of the state can be determined based on the sensor data, it is difficult for men to judge the condition of a target object by observing the sensor data, because the sensor data are not appropriately classified. Since a characteristic obtained from the sensor data is also not provided with a systematic name, and even if the sensor data is provided with a name, there is a problem that a man cannot understand the state indicated by the sensor data based on the name, since the name is a meaningless mechanical description.

When a man instructs a robot or a device to do something, there is also a problem that an interface between the man and the machine accepts only such an instruction format as to directly set a value, since a machine does not have means for learning the correspondence between men and the behavior patterns of the machine, or the correspondence in values to be changed.

The present invention is made in order to solve the above-mentioned problems, and it is an object of the present invention to be able to easily understand a state indicated by the sensor data of a machine such as a robot, etc. based on a natural language, and to operate a machine, such as a robot, etc., using natural words.

Namely, it is an object of the present invention to easily judge a status and to execute a process corresponding to the status by providing a new classifying means for sensor data, efficiently simplifying and storing an enormous amount of data, and extracting and determining, the data if judgement of the status is needed. It is another object of the present invention to provide both language processing and device operating means for a machine's learning process and storing a correspondence between an instruction from men and the operation of the machine, learning to operate according to a command, even if the instruction is vague, and storing correct operations.

SUMMARY OF THE INVENTION

A sensor data process method according to the present invention is for processing data obtained from a sensor, and comprises the steps of: storing data groups in a database in which a word is attached to each of the data groups, the data groups being obtained by classifying inputs from the sensor directly or after processing; classifying an input from the sensor using the database to output a classification result; temporarily storing input data from the sensor as data of a new group after classifying the input data when it is determined that the input data does not belong to any of the data groups classified in the database; and attaching a word to the data of the new group temporarily stored to store the data of the new group in the database.

A sensor data processing apparatus according to the present invention is for processing data obtained from a sensor, and comprises: a characteristic extracting unit for extracting a certain characteristic from sensor data input from the sensor; a characteristic comparing/classifying unit for classifying the sensor data based on the certain characteristic extracted from the sensor data; and a word attaching unit for attaching a word for each group of data groups into which sensor data are classified when there is a group that a word is not attached to in the data groups.

The sensor data processing apparatus may further comprise: a status judging unit for judging a status using a certain word attached to a group in the data groups, when input sensor data is classified by the characteristic comparing/classifying unit as data in a group to which the certain word is attached.

The word attaching unit may request a user to designate an appropriate word for a data group of sensor data to which no word is attached, and attache the appropriate word input by a user.

A device operation method according to the present invention is for processing data with a word used in a device for operating an apparatus by processing language information, and comprises the steps of: storing data indicating a behavior pattern of the apparatus in a database in which a word is attached to the behavior pattern; inputting a word for instructing an operation of the apparatus; comparing the input word and the word attached to the behavior pattern in the database; controlling the apparatus based on the behavior pattern to which the word is attached if the input word matches the word attached to the behavior pattern; and controlling the apparatus according to a behavior pattern selected from a plurality of behavior patterns available for the apparatus according to a predetermined rule or at random if the input word does not match the word attached to the behavior pattern, and when an appropriate behavior pattern is executed, attaching the input word to the appropriate behavior pattern and storing the appropriate behavior pattern in the database with the input word.

A device according to the present invention is for operating an apparatus by processing language information, and comprises: a database for storing behavior patterns of the apparatus to which words are attached; an input processing unit for inputting a word indicating an operation of the apparatus; a comparing unit for comparing the word input by the input processing unit and a word attached to a behavior pattern stored in the database; a behavior selecting unit for selecting a behavior pattern from a plurality of behavior patterns available for the apparatus according to a predetermined rule or at random if the input word does not match the word attached to the selected behavior pattern; a behavior executing unit for controlling the apparatus according to one of the behavior patterns to which a matching is detected by the comparing unit and the behavior pattern selected by the behavior selecting unit; a judging unit for judging whether or not the behavior pattern executed by the behavior executing unit is appropriate; and a word attaching unit for attaching the word input by the input processing unit to the behavior pattern judged to be appropriate by the judging unit, and storing the behavior pattern in the database.

The input processing unit may convert an input word into a word of internal data by way of language processing. The behavior selecting unit selects a behavior pattern at random when a word is input; the behavior executing unit executes a predetermined number of or all possible behavior patterns; and the word attaching unit attaches the word to a behavior pattern which obtains the highest evaluation of a certain criterion based on a result of an execution of a behavior pattern.

The device may further comprise: a criteria database storing criteria for use in judging by the judging unit; an inquiring unit for inquiring which criterion is to be used when a behavior is selected by the behavior selecting unit; and a judgement inputting unit for inputting information on a suitability of a behavior pattern executed by the behavior executing unit. In this case, the judging unit may judge a behavior based on one of the criterion obtained by the inquiring unit and the information input from the judgement inputting unit.

The device may further comprise a plurality of sensors measuring an operation status of a behavior pattern executed by the behavior executing unit, and the word attaching unit may store sensor data groups obtained from the sensor, the word, and a criterion used in a judgement by the judging unit while executing the behavior pattern judged to be appropriate by the judging unit.

The judging unit may use a characteristic of the sensor data as a criterion.

The device may further comprise an inquiring unit for inquiring of a user an appropriate behavior pattern when an evaluation higher than a predetermined level cannot be obtained by the judging unit after the behavior executing unit executes a predetermined number of behavior patterns.

A computer-readable storage medium according to the present invention is for storing programs for implementing a data processing method using data with a word for processing data obtained from a sensor. The data processing method comprises the steps of: when a sensor input is input from the sensor, classifying the sensor input using a database including data groups in which a word is attached to each of the data groups, and outputting a classification result, the data groups being obtained by classifying inputs from the sensor directly or after processing the inputs; temporarily storing input data from the sensor as data of a new group after classifying the input data when it is determined that the input data does not belong to any of the data groups classified in the database; and attaching a word to the data of the new group temporarily stored to store the data of the new group in the database.

A computer-readable storage medium according to the present invention is for storing programs for implementing a device operation method for processing data with a word used in a device for operating an apparatus by processing language information. The device operation method comprises the steps of: inputting a word for instructing an operation of the apparatus; comparing the input word and a word attached to a behavior pattern stored in a database; controlling the apparatus based on the behavior pattern to which the word is attached if the input word matches the word attached to the behavior pattern; and controlling the apparatus according to a behavior pattern selected from a plurality of behavior patterns available for the apparatus according to a predetermined rule or at random if the input word does not match the word attached to the behavior pattern, and when an appropriate behavior pattern is executed, attaching the input word to the appropriate behavior pattern and storing the appropriate behavior pattern in the database with the input word.

BRIEF DESCRIPTION OF THE DRAWINGS

FIG. 1 shows a configuration of the sensor data processing apparatus according to the present invention.

FIG. 9 is a flowchart of the characteristic comparison/classification unit.

FIG. 10A and FIG. 10B are flowcharts of the word provision unit.

FIG. 11 shows the user interface of the word provision unit.

FIG. 13 shows a data format of the database.

FIG. 14A and FIG. 14B show another data format of the database.

FIG. 17 shows an example of sensor data.

FIG. 19 shows an example of location data.

DESCRIPTION OF THE PREFERRED EMBODIMENT

Figure 2:
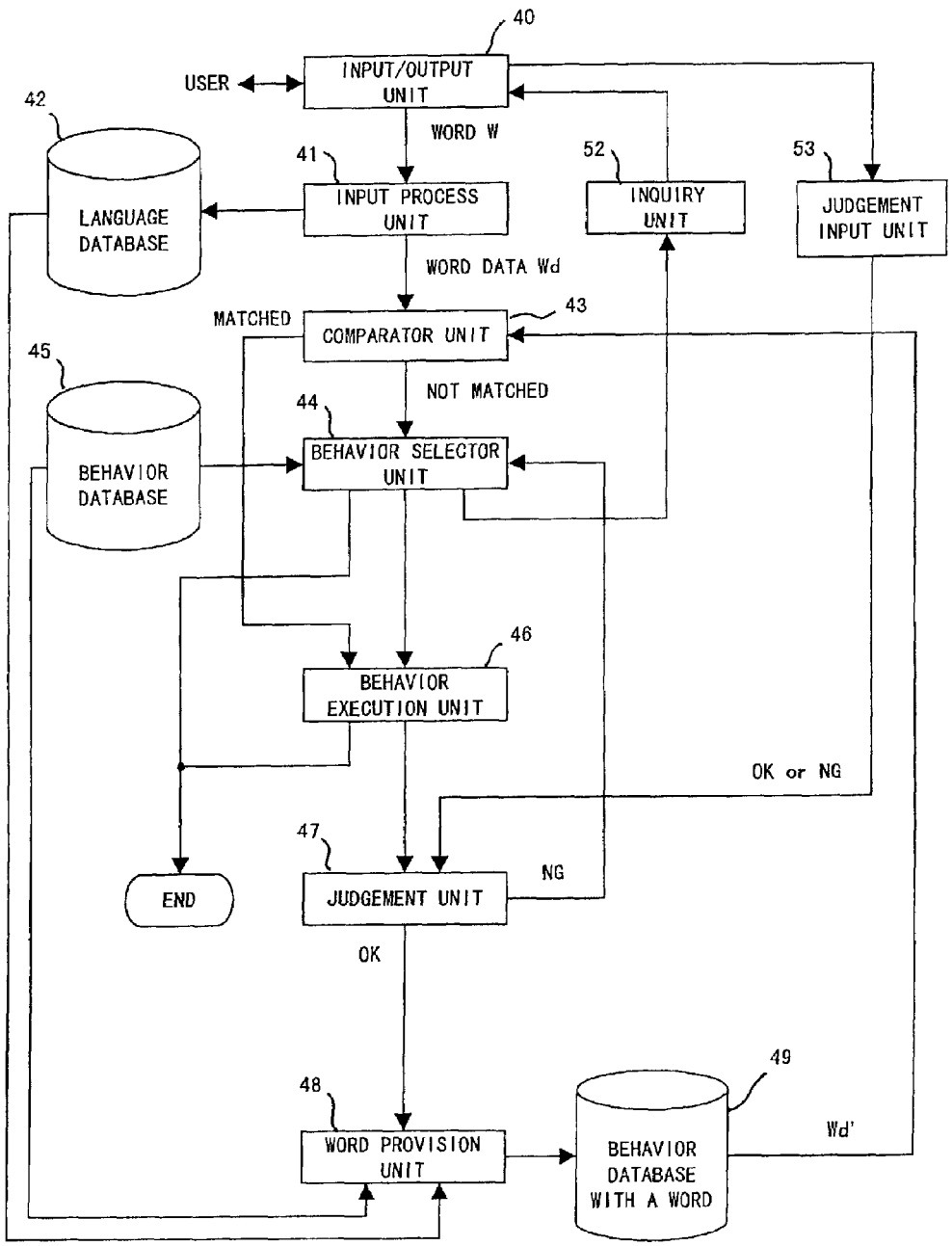
FIG. 2 shows a configuration of a device operation apparatus including the language process interface according to the present invention.
Figure 3:
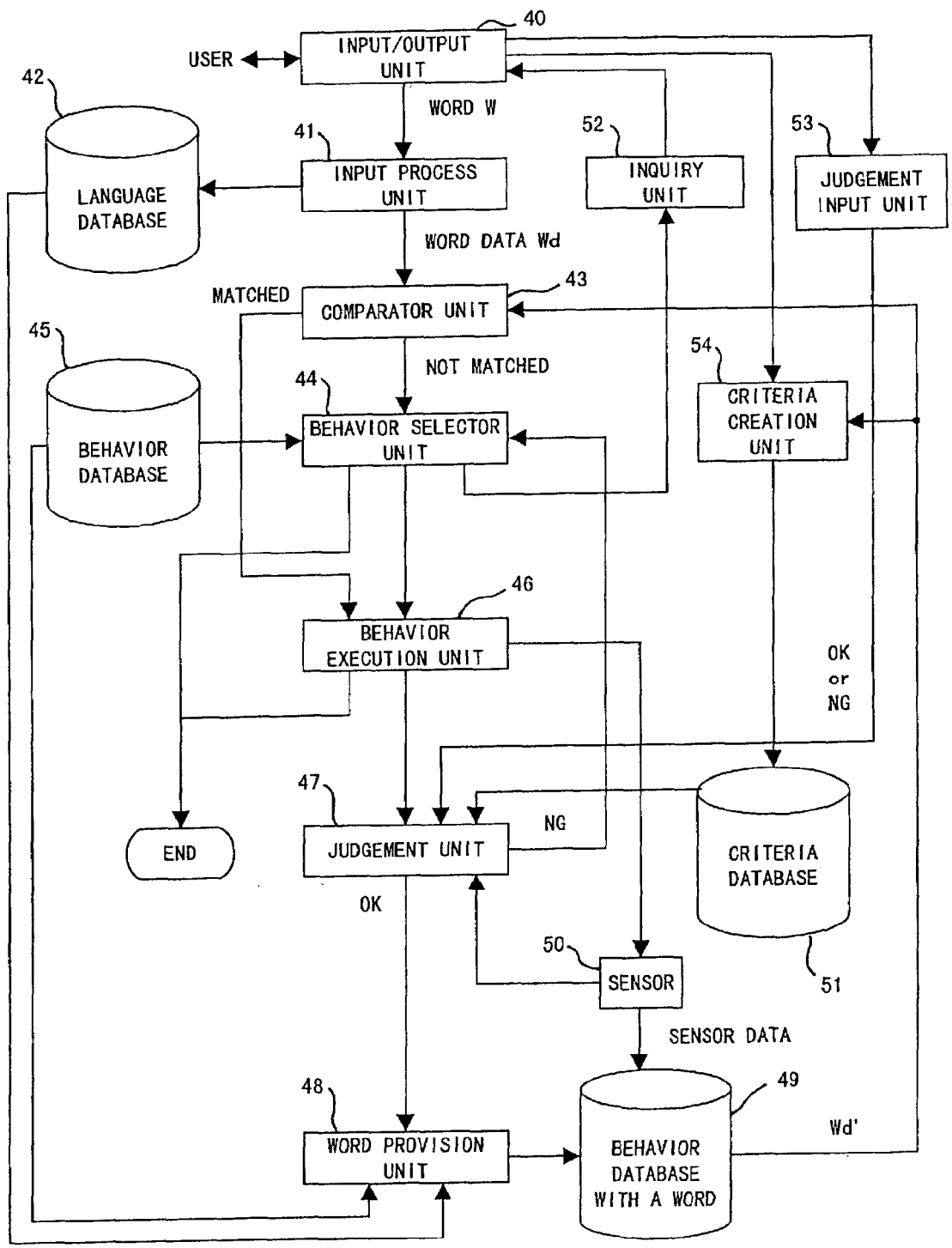
FIG. 3 shows another configuration of a device operation apparatus including the language process interface according to the present invention.

In order to solve the above-mentioned problems, the present invention has, for example, such a configuration as shown in FIG. 1 to FIG. 3.

FIG. 1 shows a configuration of a sensor data processing apparatus according to the present invention.

A characteristic extractor unit 2 extracts characteristics from the sensor data obtained from an information input unit 1 such as a sensor, etc. A characteristic comparison/classification unit 3 compares a characteristic T extracted by the characteristic extractor unit 2 with data groups registered in a word attached database (database with words) 6, in which a word is attached to each of the data groups. If there is a similar data group, the characteristic comparison/classification unit 3 reports the corresponding word to a status judgement unit 4, while if not, the characteristic comparison/classification unit 3 classifies the characteristic T into one of data groups classified in a database (database with no word) 7, or creates a new category (group) in the database 7 and stores the characteristic T in the new category.

The status judgement unit 4 judges the status indicated by the sensor data based on the word of a data group corresponding to the characteristic T. A data group 8 including a word B is the data group judged to have the same characteristic T.

A word provision unit 5 attaches a word that men can understand (a human-comprehensible word) to a data group of the database with no word 7, and registers the data group in the database with a word 6. A data group deletion unit 10 deletes from the database with no word 7 a data group which is not provided with a word after the lapse of a certain time and is judged to be unnecessary.

The database with no word 7 is a database for storing a characteristic T which does not match with a characteristics of the data groups with words registered in the database with a word 6, until a word is attached or until a predetermined time elapses. A database for storing raw data 9 is a database for storing data input from the information input unit 1 as they are. The apparatus can also be configured so that the characteristic data (value) extracted by the characteristic extractor unit 2 are stored in the database for storing raw data 9 with the input raw data.

One or plural kinds of the information input unit 1 can be used, and data input from the information input unit 1 which is a target for characteristic data extraction can be data at a certain time point or a string of data in a time series.

The word provision unit 5 is activated by a user's instruction or automatically by a predetermined trigger, requests a user to designate an appropriate word in order to attach a word to a data group of sensor data with no word stored in the database with no word 7, and attaches a word input by the user to the data group. The word provision unit 5 attaches a code, which is to be a provisional name, to a data group stored in the database with no word 7 until a word is provided, and replaces the code previously attached with a word input by the use.

When requesting the user to designate an appropriate word, if the data group is related to static characteristic data, the word provision unit 5 displays information suggesting to the user that a noun should be attached, while if the data group is data in a time series and is related to a dynamic characteristic data or characteristic data indicating a status change, the word provision unit 5 displays information suggesting to the user that a verb should be attached. Furthermore, for characteristic data indicating some status of the sensor, the word provision unit 5 can recommend to the user to attach, for example, an adjective.

A program for implementing the above-mentioned process units by a computer can be stored in an appropriate computer-readable storage medium such as a portable storage medium, a semiconductor memory, a hard disk, etc.

The characteristic extractor unit 2 can be configured by a general-purpose computer and a software program, or a part or all of the unit 2 can also be configured using a multilayer hierarchical neural network in which the input and output have the same value. In this case, sensor data are input to the hierarchical neural network in order to extract characteristic data, and are classified by the input and output patterns from an intermediate layer other than an output layer.

The operations of the apparatus shown in FIG. 1 are as follows.

The characteristic extractor unit 2 extracts a variety of characteristics (for example, a shape, a color, etc.) indicated by sensor data input from the information input unit 1 such as a sensor, etc. The extracted characteristic T is compared with data groups registered in the database with a word 6 by the characteristic comparison/classification unit 3. Data groups of the database with a word 6 are provided with an appropriate word (word A).

For example, if it is judged according to certain criteria that the characteristic T matches with one of the data groups registered in the database with a word 6, the flow is branched into "Matched", and the state or condition of the sensor is judged by the status judgement unit 4. In FIG. 1, it is assumed that the characteristic T matches with a data group 8 indicated by a word B.

If it is judged by the characteristic comparison/classification unit 3 that the characteristic T does not match with any of data groups in the database with a word 6, the characteristic T is registered in the database with no word 7. In this case, if there is in the database with no word 7 a data group whose characteristic matches with the characteristic T, the characteristic T is added to this data group, while if not, the characteristic T is registered as a new data group.

An appropriate word is attached to a data group in the database with no word 7 by the word provision unit 5 according to certain criteria. The word provision unit 5 attaches an appropriate word representing the characteristic to the data group with no word by requesting a user (operator) input. The data group to which a word is attached is registered in the database with a word 6.

A word is attached to a data group corresponding to the characteristic of the data group. If the data group is an aggregate of data indicating a static characteristic (no status change due to time, etc.), the user is requested to designate a noun or the like. If the data group is an aggregate of data indicating a dynamic characteristic accompanied by a status change (location change of a moving object, etc.), the user is requested to designate a verb or the like. If the data group is an aggregate of data indicating a characteristic of the state of an object (color, weight, etc.), the user is requested to designate an adjective or the like.

In the present invention, by classifying sensor data obtained from the information input unit 1 using a word or an item which is meaningful for a man through the above-mentioned processes, the status judgement from the sensor data can be facilitated. Specifically, a programming for determining an instruction to be executed can be facilitated by this word, and the announcement of a status can be performed by spoken words, etc., thereby easily determining a performance based on the sensor data.

FIGS. 2 and 3 show configurations of device operation apparatuses each including a language process interface according to the present invention. In FIGS. 2 and 3, units with the same function have the same reference numbers. FIG. 3 shows a configuration in which a sensor 50, a criteria database 51, and a criteria creation unit 54 are added to the configuration shown in FIG. 2.

An input/output unit 40 includes an input/output device such as a microphone, a keyboard, a speaker, a display, etc.

When a word W such as a word spoken by a man, etc., or a code input from a keyboard, is input from the input/output unit 40, an input process unit 41 converts the word W into a computer-readable code string, which is word data Wd, further stores both the original word W and the word data Wd in a language database 42, and activates a comparator unit 43.

The comparator unit 43 compares the word data Wd with the word data Wd' of behavior data with a word stored in a behavior database with a word 49. If the word data Wd and Wd' match with each other, the comparator unit 43 activates a behavior execution unit 46, and executes the behavior pattern of the behavior data with a word, while if not, it activates a behavior selector unit 44.

The behavior selector unit 44 selects one behavior pattern A from a behavior database 45 for storing a plurality of possible behavior patterns A according to a criterion or a standard, and activates the behavior execution unit 46 to execute the selected behavior pattern.

The selected behavior pattern is executed by the behavior execution unit 46, and the result of the execution is judged by a judgement unit 47. As a result, if the executed behavior pattern is judged not to meet certain criteria, the behavior selector unit 44 selects a behavior pattern B different from the behavior pattern A previously executed according to certain criteria, and activates the behavior execution unit 46 to execute the selected behavior pattern B. If there is no behavior pattern to be selected, the process is terminated. When a judgement result meeting certain criteria is not obtained even after a predetermined number of behavior patterns are executed, the execution of the behavior is interrupted or an inquiry unit 52 for issuing inquiries to the user is activated. Alternatively, the apparatus can also be configured so that all possible behavior patterns can be executed, and the seemingly best behavior pattern Am can be selected by the user.

The behavior execution unit 46 executes the behavior pattern A selected by the behavior selector unit 44, and activates the judgement unit 47. When the behavior pattern A is provided by the comparator unit 43, the behavior execution unit 46 executes the behavior pattern A, and the execution is terminated.

The judgement unit 47 verifies both word data Wd and the behavior pattern A according to user's commands from a judgement input unit 53. If it is judged to be OK (verified), the judgement unit 47 activates the word provision unit 48, while, if it is judged to be NG (not verified), the judgement unit 47 activates the behavior selector unit 44.

The word provision unit 48 attaches word data Wd to the behavior pattern A which meets certain criteria in the judgement unit 47, and stores both the behavior pattern A and the word data Wd in the behavior database with a word 49.

The behavior database with a word 49 is a database for storing a set of the behavior pattern A and word data Wd attached to the behavior pattern A in a certain format, or a database for making a set of the behavior pattern A, sensor data obtained from a sensor 50 during the execution of the behavior pattern A and word data Wd attached to the data, and storing the set in a certain format.

The sensor shown in FIG. 3 is a sensor for measuring the execution status of the behavior pattern A while the behavior execution unit 46 is executing the certain behavior pattern A.

When, as an execution result of several behavior patterns, an appropriate behavior cannot be selected for the given word W, the inquiry unit 52 inquires of the user what is an appropriate behavior. Inquiries are made by spoken words or by means of a menu using an input/output unit 40 such as a speaker, a display, etc.

When there is no criteria for judging whether or not the selected behavior pattern is appropriate for the given word W in the criteria database 51, the user directly inputs a judgement (OK or NG) using the judgement input unit 53.

The criteria creation unit 54 stores criteria input by the user in the criteria database 51. Alternatively, when a judgement is made directly by the user, in order to create an appropriate criterion, the criteria creation unit 54 extracts some characteristic from the sensor data, and stores the characteristic as a criterion.

A program for implementing the above-mentioned process units by a computer can be stored in an appropriate computer-readable storage medium such as a portable storage medium, a semiconductor memory, a hard disk, etc.

The operations of the apparatus shown in FIGS. 2 and 3 are as follows.

A word W (command) given by the user, etc. is processed by the input process unit 41, and is converted into word data Wd (instruction data) comprehensible to a computer. The word W (command) is a verbal command, for example, "Speed up!" or "Turn right!", and is not needed to be indicated by an actual value. The word W and the word data Wd are stored in the language database 42 in a format where the correspondence between the word W and the word data Wd can be recognized. For example, if the word W is an audio signal, the input process unit 41 stores audio signals input from a voice input device such as a microphone, etc., or extracts the characteristic of the audio signals, and outputs the extracted data as word data Wd.

Although usually the word W is a natural word, word data Wd are simply an internal code for a computer corresponding to the word W and do not have a meaning as a natural word. A computer does not have to know the meaning of the word W. By providing the input process unit 41 with a speech recognition function, a voice input can also be processed in the same way as a character input from a keyboard, etc. Alternatively, for example, if a dictionary of synonyms, etc. is provided and the input word W is converted into another word W' with the same meaning, word data corresponding to the word W' can also be used for the processes after that.

After being processed by the input process unit 41, word data Wd are compared with data stored in the behavior database with a word 49 by the comparator unit 43. If there are no data in the behavior database with a word 49, no comparison is made, and immediately the behavior selector unit 44 is activated.

If there are behavior data with a word in the behavior database with a word 49 and the word data Wd match with one of the behavior data with a word, the behavior pattern is executed by the behavior execution unit 46, and after the completion of the execution the instruction is terminated.

On the other hand, if the word data Wd do not match with any of the behavior data with a word, the behavior selector unit 44 is activated. The behavior selector unit 44 selects an appropriate behavior pattern out of possible behavior patterns for the apparatus stored in advance in the behavior database 45 (for example, all instructions for implementing conventional instructions such as "Speed up by a certain degree!", "Change the direction by a certain degree!", "Change the temperature by a certain degree!", etc.), and requests the behavior execution unit 46 to execute the behavior pattern. The behavior execution unit 46 executes the requested behavior pattern.

As a rule, the behavior result is judged by the user. For the judgement, if a behavior selected by the apparatus corresponds to an instruction given by a user, OK is input from the judgement input unit 53, while, if not, NG is input. The input from the judgement input unit 53 is a simple input such as "The execution result is right or wrong.", and is input from the input/output unit 40 such as a keyboard, a switch, etc. The appropriateness of the behavior can also be determined by a user inputting a word such as "right" or "wrong" from the input process unit 41 a certain time after the completion of the behavior. In this case, behavior data will be "Judge that the previous behavior is right!", etc.

Since in this judgement method a user always has to monitor the behavior state of the apparatus, the method is complicated. If a user can create criteria in advance and when the behavior meets the criteria, the behavior can be judged to be OK, and the method is more convenient. Thus, a user makes an inquiry about criteria using the inquiry unit 52. The obtained criteria are stored in the criteria database 51. When a state where given criteria are met is realized, the judgement unit 47 judges that it is OK. In this case, the judgement is made by comparing sensor data. Thus, an apparatus is configured so that criteria can also be obtained from sensor data. For example, if an instruction "Increase the speed (V)!" is issued, an acceleration $\alpha$ (>0) detected from the output of the sensor 50 becomes the criterion.

The criterion can be laid down on what should happen in the behavior pattern stored in the behavior database 45. For example, if a behavior pattern is about changing the speed V, it is sufficient that acceleration $\alpha$ becomes positive or negative. Accordingly, the criterion is either "acceleration $\alpha>0$" or "acceleration $\alpha>0$".

When a user, etc. directly judges without using criteria, the criteria will be vague. Thus, an appropriate characteristic data (value), for example, an average speed, an acceleration, etc. is calculated from sensor data obtained when an OK'd behavior is executed, and are stored in the criteria database 51 as a criterion.

If as a result of the judgement it is judged to be OK, the word provision unit 48 is activated, an executed behavior and the word data Wd of a given verbal instruction are combined, and the combination of the behavior and the word data Wd are stored in the behavior database with a word 49 as behavior data with a word. That is, data such as "Instruction: Speed up!→Behavior: Acceleration $\alpha>0$" are stored.

On the other hand, if it is judged to be NG, the behavior selector unit 44 is activated to select a next behavior. In this case, the behavior selector unit 44 selects and executes a behavior other than those executed before.

Furthermore, the criteria according to which behavior data with a word is judged to be OK are stored in the criteria database 51 in such a way that the criteria can correspond to the word. Thus, which criterion should be used when a certain instruction is issued is learned one by one. Accordingly, the criteria can be automatically used without inquiring of a user.

Figure 4:
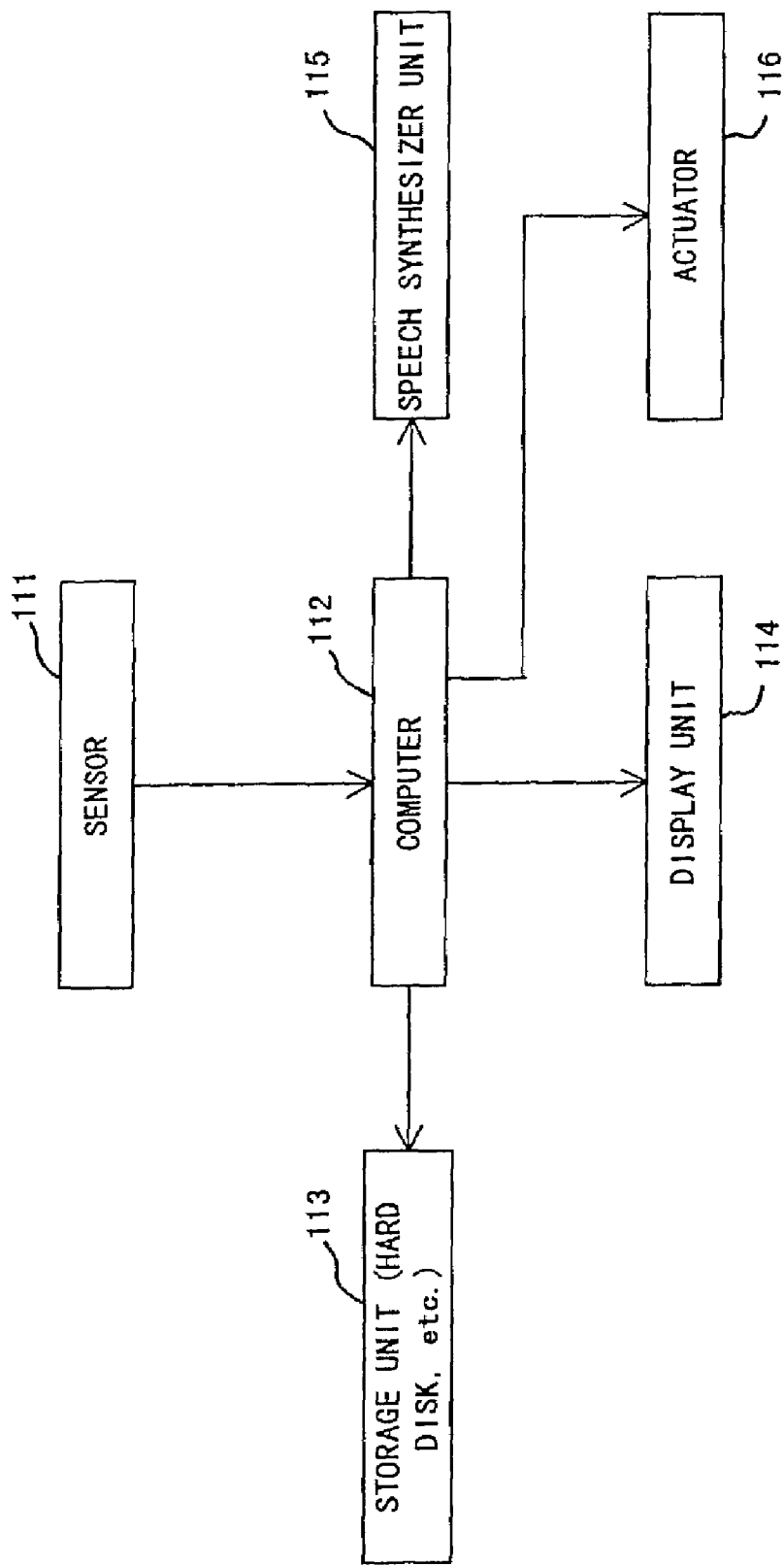
FIG. 4 shows a hardware configuration for implementing the sensor data processing apparatus according to the present invention.

FIG. 4 shows a hardware configuration for implementing the data sensor processing apparatus of the present invention.

For the information input unit 1 shown in FIG. 1, for example, a sensor 111 is used, and a sensor signal is obtained by a computer 112. The obtained data and characteristic data are stored in a storage unit 113, and the database with a word 6 and the database with no word 7 are realized as the storage unit 113 such as a hard disk, etc. The processes such as characteristic extraction, characteristic classification, status judgement, etc. are executed by the computer 112. The results of the status judgement are presented to a user using a display unit 114, a speech synthesizer unit 115, etc. When an actuator 116 is controlled by the result of the status judgement according to control information selected by the result of the status judgement, for example, some work such as a forward movement, backward movement, rotation, etc. is executed.

The display unit 114 and the speech synthesizer unit 115 are also used for the inquiry to a user at the time of providing a word. When a user inputs a word, the word is input using a keyboard, a mouse or a speech recognition unit, which are all kinds of sensors. Therefore, all input devices to these computers 112 are shown as sensors 111.

Each computer 112 comprises one or a plurality of processors (CPU) and a memory for storing programs and data for control. The computer 112 can also comprise a neuro-computer such as a hierarchical neural network, etc.

Figure 5:
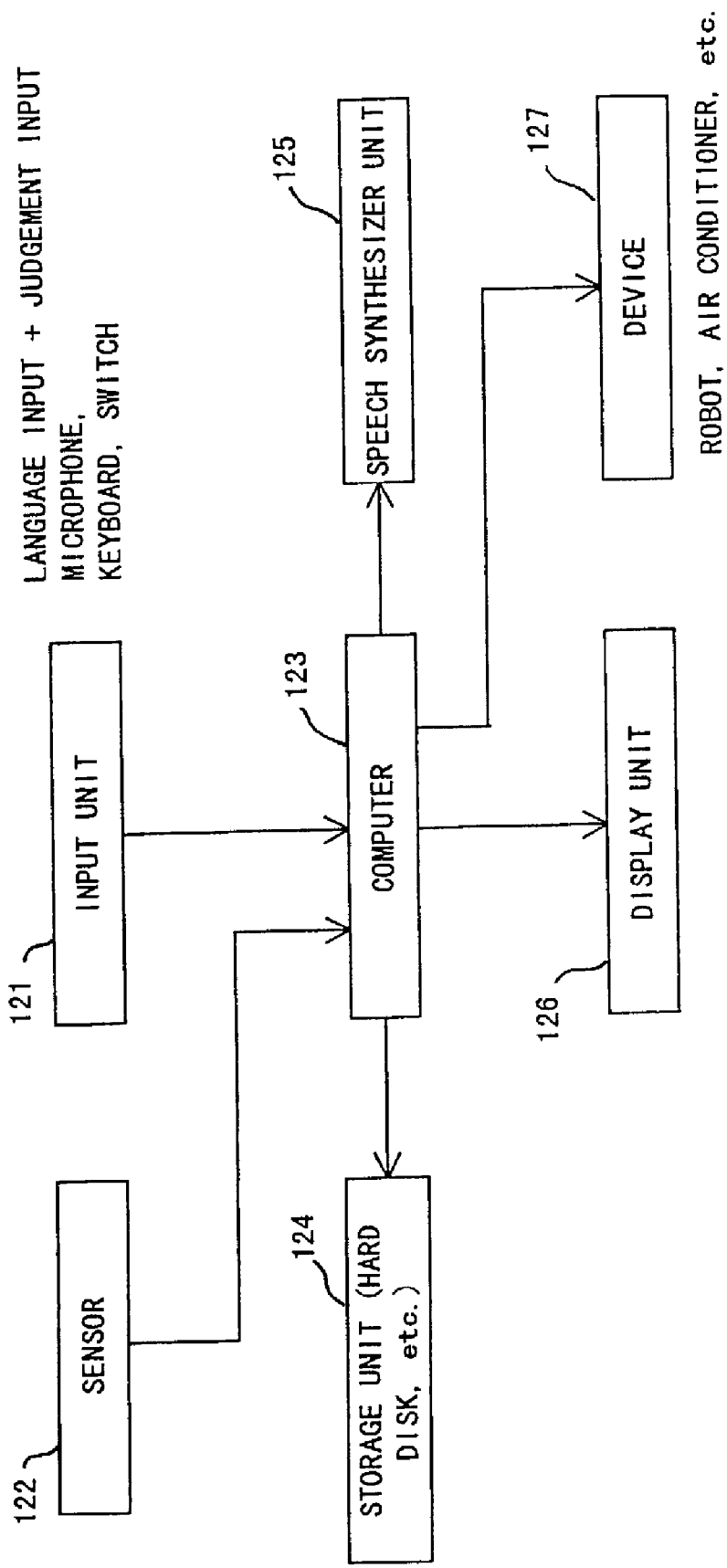
FIG. 5 shows a hardware configuration for implementing a device operation apparatus including the language process interface according to the present invention.

FIG. 5 shows a hardware configuration for implementing a device operation apparatus with the language process interface of the present invention.

An input unit 121 is an input device for inputting an instruction from a user, such as a microphone, a keyboard, etc. or an input device for inputting the judgement by a switch, etc. The input data are transmitted to a computer 123. A sensor 122 is a sensor for measuring the status during the execution of a behavior, and the data are received by the computer 123.

The computer 123 executes the program according to the present invention, processes an input audio signal and a sensor signal, and stores the result of the process in a storage unit 124.

The storage unit 124 stores a variety of databases and the program of the present invention, and comprises a hard disk, a semiconductor memory, etc. A speech synthesizer unit 125 issues a spoken word (or voice) when there is an instruction which requires a spoken word, and synthesizes and issues the spoken word when inquiring of the user.

The display unit 126 is used in the same way as described above, and displays a processing state during the execution of a variety of processes. A device 127 is a device such as a robot, an actuator, air conditioner, etc., and is operated by an instruction from the user. The input unit 121 through the display unit 126 can be made separately from the device 127, and it can also be made as a hardware configuration wherein the input unit 121 through the display unit 126 are incorporated into the device 127.

A mobile (travelling) robot for which the present invention is applied is described below with reference to the drawings.

1. Sensor Data Processing Apparatus

First, the sensor data processing apparatus of the present invention is described.

Figure 6:
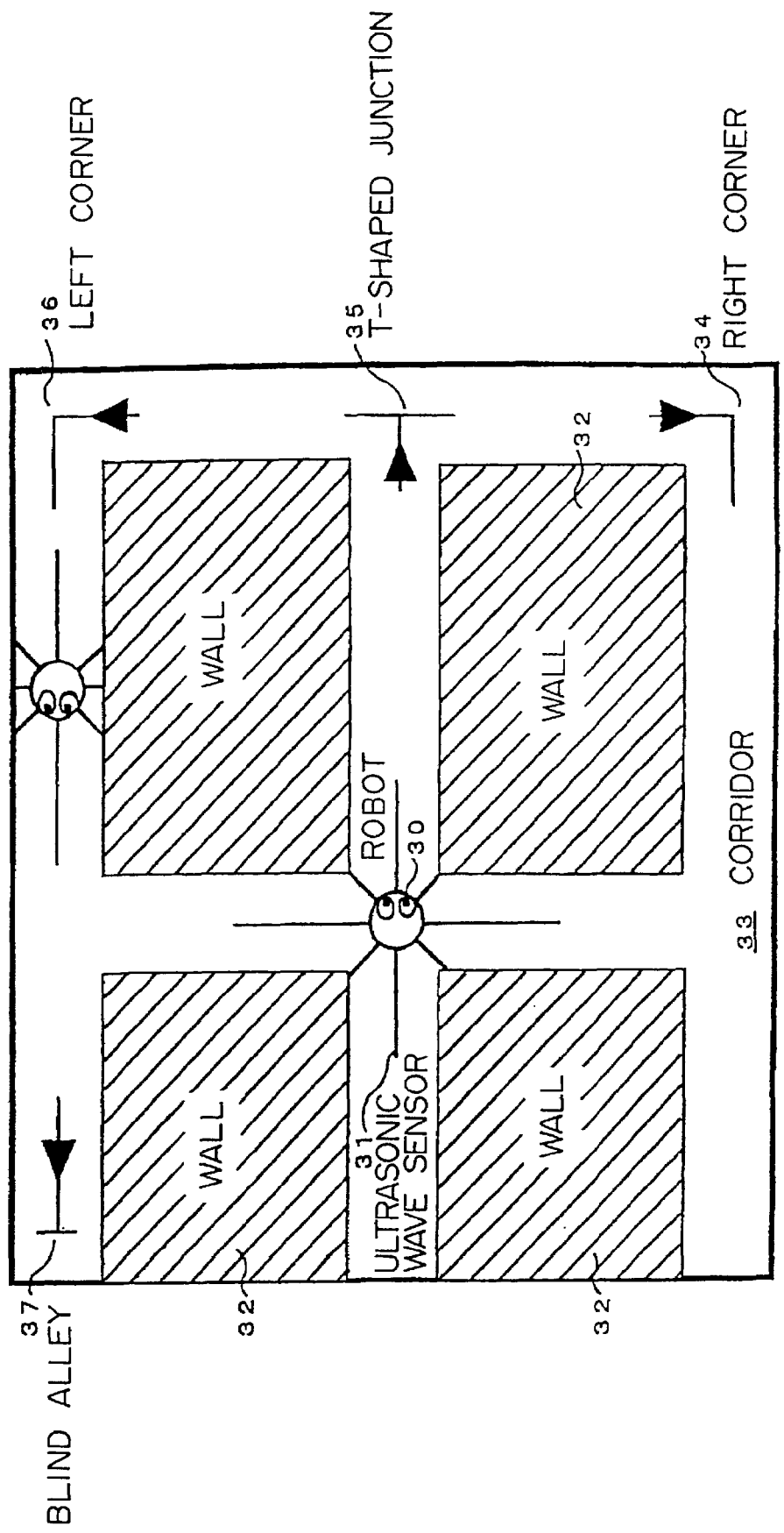
FIG. 6 shows a case where a moving robot with ultrasonic wave sensors is located in a certain environment.

FIG. 6 shows that a mobile robot 30 with an ultrasonic wave sensor is located in a certain environment. Although only ultrasonic sensor data are considered here, the sensor data of the present invention are not necessarily limited to this kind. For example, sensor data including both the location (X, Y) and direction θ of a robot 30 can also be used. This mobile robot 30 includes an ultrasonic wave sensor (or ultrasonic sensor) 31 for the information input unit 1 in FIG. 1. Eight ultrasonic wave sensors 31, for example, are provided around the body of the robot 30, and the distance between the sensor and a certain object can be measured.

In the environment where a robot is located in this example includes a corridor 33 surrounded by walls (or dividers) 32, a right corner 34, a T-shaped junction 35, a left corner 36 and a blind alleys 37, etc. at the end of the corridor 33.

The value of sensor data measured at a certain location using the eight ultrasonic wave sensors 31 is assumed to be U. U is a vector consisting of eight sets of distance data. The robot 30 moves, and the values of the ultrasonic wave sensors 31 are measured at intervals of a sampling time.

Since the distance data in a place such as the corridor 33 obtained by the ultrasonic wave sensors 31 are short to the left and right, and long to front and back of the robot 30, the outputs of the ultrasonic wave sensors 31 are expected to be in such a state as mentioned above. While moving through the corridor, the robot 30 obtains a lot of ultrasonic wave sensor data of similar values.

Figures 7A, 7B:
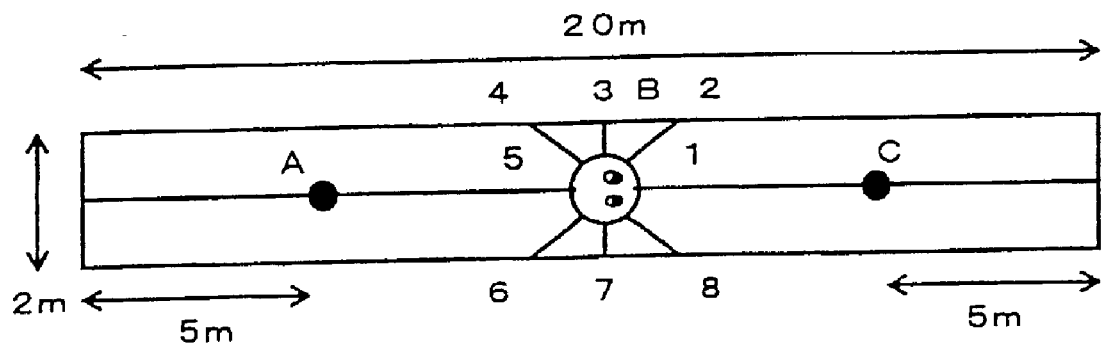
FIG. 7A and FIG. 7B show an example of sensor data.

FIG. 7A and FIG. 7B show an example of the ultrasonic wave sensors data.

It is assumed that there are eight ultrasonic wave sensors for measuring the distances of 8 objects located in the directions of 1 through 8 from the robot, and all the sensors can measure a distance of up to 10 m. For example, in a rectangular space 2 m wide and 20 m long as shown in FIG. 7A, the ultrasonic wave sensor data corresponding to locations A, B and C in the diagram become as shown in FIG. 7B. In this case, it is assumed that the radius of the robot is 0.4 m, and the ultrasonic wave sensors are set on the surface of the robot.

Next, a concrete example of each process unit composing the present invention is described in detail.

(1) Information Input Unit

When data is input from an information input unit 1 (ultrasonic wave sensor 31 in this embodiment), the data is transmitted to a characteristic extractor unit 2. If a characteristic extraction method is predetermined, a characteristic extraction is performed according to this method. Raw data from which a characteristic was extracted are discarded or stored in a database for storing raw data 9. Since there is also a case where a characteristic is extracted from time series data, it is desirable to store the raw data, and basically the input data are stored in the database for storing raw data 9.

(2) Characteristic Extractor Unit

Figure 8:
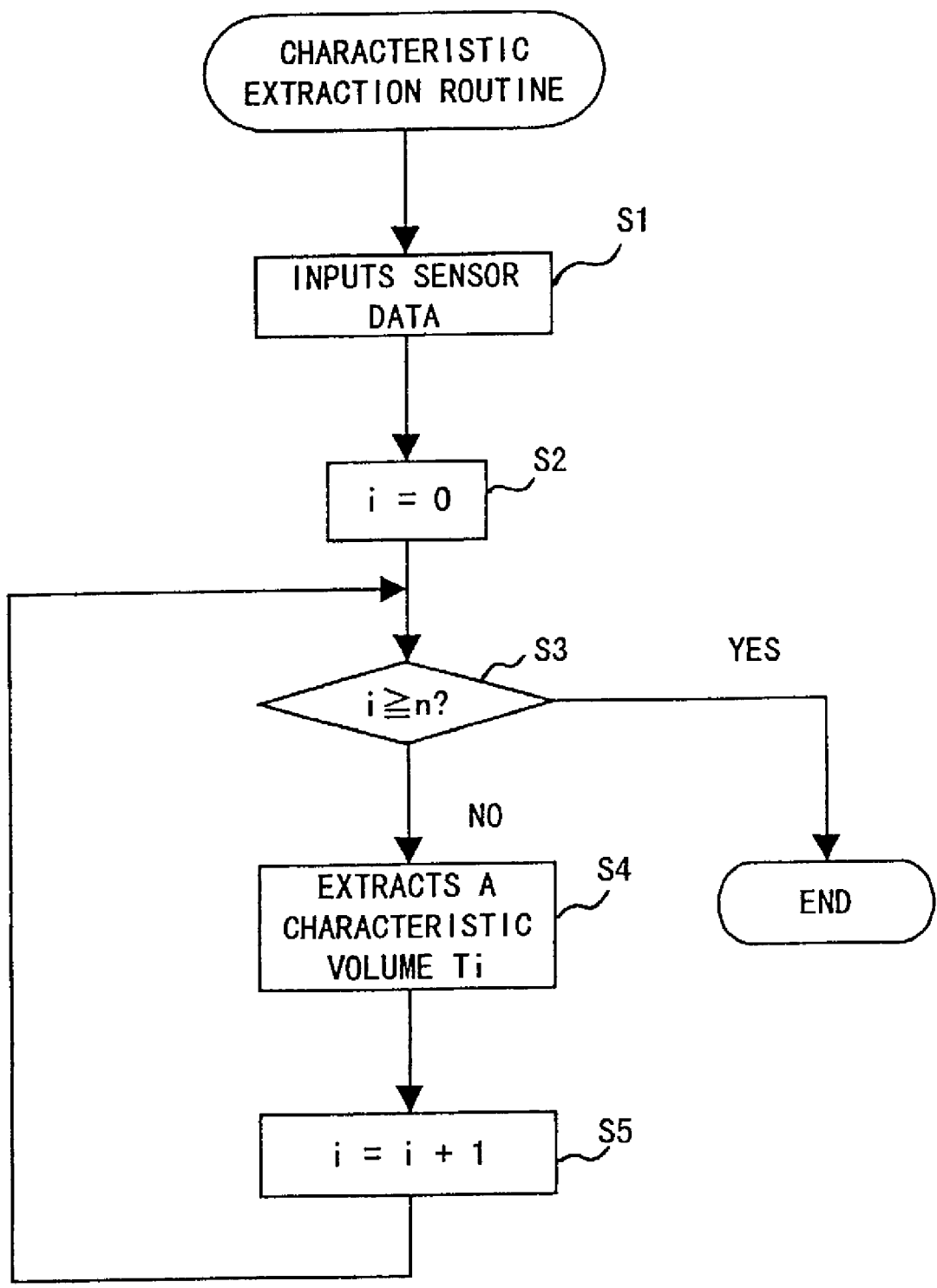
FIG. 8 is a flowchart of a characteristic extractor unit.

The characteristic extractor unit 2 is provided with a predetermined characteristic extraction method. FIG. 8 is a flowchart showing the operation of the characteristic extractor unit 2. Two or more characteristic extraction methods may be used. In this case, an extracted characteristic data becomes vector data. Here, it is assumed that n sets of characteristic data $T_0$ through $T_{n-1}$ are extracted. First, sensor data are input (step S1 in FIG. 8), and i is initialized to 0 (step S2). Then, characteristic data $T_i$ is extracted (step S4), and the extraction of the characteristic is repeated while incrementally increasing i (step S5), and the extraction is terminated when i reaches n (step S3).

At this time, the input data themselves can also be taken as the result of the characteristic extraction process without extracting any characteristics. In this case, the sensor data themselves are regarded as a characteristic. However, since the capacity of data to be stored becomes large, this method may not be efficient. Therefore, here, a characteristic of the sensor data such as that the distance is long to the front and back, and short to the left and right, is assumed to be extracted. For the characteristic data, a ratio of the front-to-back distance to the left-to-right distance of the ultrasonic wave sensor data is used. This characteristic data T, for example, is calculated using the following equation.

$$T=(U1+U5)/(U3+U7)$$

Un is the n-th data of the ultrasonic wave sensor. If the data in FIG. 7B are substituted into this equation, characteristic data (value) $T_A$ at location A, characteristic data $T_B$ at location B, and characteristic data $T_C$ at location C become 12.2, 16.0, and 12.2, respectively. When the robot is located at a crossroads or at the center of a wide space, the characteristic data T become a value near to 1, because the front-to-back distance and the left-to-right distance are almost the same. Therefore, if original ultrasonic wave sensor data are classified according to a criterion of, for example, T>10, a value of characteristic data T which is a standard value for judging whether or not the robot is located in a corridor can be obtained. Then, the obtained value of characteristic data T is transmitted to a characteristic comparison/classification unit 3.

Then, when new sensor data are input, a characteristic extraction is performed in the same way as described above, and the extracted characteristic data T is transmitted to the characteristic comparison/classification unit 3. Further, raw data are stored in the database for storing raw data 9. The characteristic data can also be stored in the database for storing raw data 9 together with the raw data.

The characteristic data extracted by the characteristic extractor unit 2 can be any characteristic, if the characteristic is obtained from target data, and if there is no appropriate characteristic data, the input data themselves can be used as characteristic data.

There are two kinds of sensor data; static data with no relation to time and time series data changeable with a lapse of time.

The static data with no relation to time provide a single characteristic by themselves. Generally speaking, the ratio of RGB over a whole screen, an area expressed in a binary system, a number of edges in a picture, etc. can be used as characteristic data of picture data. When ultrasonic wave sensors are provided in four directions of the front, back, left, and right, the ratio between the distances of the four directions, for example, a distance ratio of the front-to-back direction to the left-to-right direction, such as "a front-to-back distance is longer than a left-to-right distance", "only a front distance is longer than the back, left, and right distances", etc. is used for characteristic data. These are examples of the characteristic extraction method from static data.

In the case of time series data, the change with the passage of time of obtained data is extracted as characteristic data. For this, the time differential of sensor data obtained from hour to hour is used. For example, a differential of ratios of RGBs over the whole screens between two pictures at the times of t and t+Δt, a differential of the areas expressed in a binary system between the two pictures, a differential of the numbers of edges in the two pictures, etc. are used. When ultrasonic wave sensors are used, a differential between two sensor data obtained at the times of t and t+Δt are used, if attention is paid to the status change. The speed or acceleration of the movement of a robot, which already includes a time element, can also be used as characteristic data.

(3) Characteristic Comparison/Classification Unit

The characteristic comparison/classification unit 3 comprises a characteristic comparator unit for comparing the input data with word attached data groups registered in a database with a word 6, and a characteristic classification unit for registering the input data in a database with no word 7, if there are no same data groups among the word attached data groups.

(3.1) Characteristic Comparator Unit

The characteristic comparator unit receives an extracted characteristic data (value) Ti (i=0, ..., n−1) or when there is no characteristic data extraction, the ultrasonic wave sensor data themselves, and compares the characteristic data Ti or the ultrasonic wave sensor data with k data groups in the database with a word 6, and judges whether or not there is a corresponding data group. Each of the k data groups have $m_g$ elements. $m_g$ is not necessarily constant. FIG. 9 is a flowchart showing this process.

In a characteristic comparison, first, the characteristic data (value) Ti is input (step S11 in FIG. 9). Then, a loop variable g for counting the number k of the data groups in the database with a word 6 is initialized to 0 (step S12). Then, the similarity between characteristic data Ti whose i is 0 to (n−1) and characteristic data Tj whose j is 0 to ($m_9$−1) are compared (steps S14 through S20) while incrementing g by one (step S21) until the variable g exceeds k (step S13). Here, Tj is the j-th characteristic data of the g-th data group in the database with a word 6.

Since at the time of initializing, there are no data in the database with a word 6 (k=0), there is no target for comparison, and thereby the result of the comparison becomes "not matched" Then, the characteristic data (value) T is transmitted to the characteristic classification unit as it is. If there are some data in the database with a word 6, the similarity between two characteristic data is calculated, and it is judged whether or not the two characteristic data match with each other. The similarity of the two characteristic data T, for example, is calculated using the distance L between the two values of the characteristic data T according to the following equation.

$$L=(T_i-T_j)^2 (i \neq j)$$

If characteristic data is expressed as a vector, the distance L is the sum of the distances of each element. If the distance L is less than a certain threshold $\epsilon$, those sensor data are judged to be "matched". Characteristic data (value) Ti judged to be "matched" is stored in a corresponding data group in the database with a word 6, and simultaneously is transmitted to a status judgement unit 4. Characteristic data judged to be "not matched" is transmitted to the characteristic classification unit.

A concrete similarity judging method in the case where raw data are used as they are is described below taking ultrasonic wave sensor data as an example. The ultrasonic sensor data are assumed to be a vector consisting of eight elements. First, input ultrasonic wave sensor data are assumed to be D1. In order to search data similar to D1, one set of target data for search is selected, which is assumed to be Dt. The similarity degree between D1 and Dt, for example, is calculated by the following distance calculation equation.

$$L=(D1-Dt)^2$$

It can be estimated that the smaller the value of the distance L is, the more similar D1 and Dt are. Sensor data other than ultrasonic wave sensor data can also be processed in the same way. For data from other sensors, similarity can be judged in the same way, if the arrangement of each element is set to be the same.

When the input data are compared with data groups classified according to a criterion of "characteristic data T>α (α is a constant)", it is sufficient if it is judged whether or not T>α.

(3.2) Characteristic Classification Unit

The characteristic classification unit of the characteristic comparison/classification unit 3 searches for characteristic data similar to characteristic data T in the database with no word 7. Although the process procedure of the characteristic classification unit is the same as the flowchart shown in FIG. 9, characteristic data Tj with which input data are compared is selected from the database with no word 7. In the database with no word 7 there are data groups classified by some characteristic data. Then, a similarity judgement is performed against arbitrary data composing each data group. Here, all data can also be compared. For the similarity judgement, for example, the distance L between the values (two sets of data) is used.

$$L=(T_i-T_j)^2 (i \neq j)$$

If the distance L is less than a certain threshold $\epsilon$, those sensor data are judged to be similar. If new data are judged to be "similar" against arbitrary data belonging to a certain data group, the new data are registered in that data group. If the new data are judged to be "not similar", the new data are registered in the database as a new data group.

For the classification of raw data from which a characteristic is not extracted, a similarity judgement is available from the distance calculation of each element of a sensor used in the characteristic comparator unit.

In another classification method, classification is performed according to a criterion of what range of values the characteristic T is in. For example, input data can also be classified according to a criterion of "characteristic data T>α (α is a constant)". This criterion is used, for example, when input data are classified as follows; if a speed is positive, move forward, if negative, move backward, and if zero, stop.

(4) Word Provision Unit

Figure 10B:
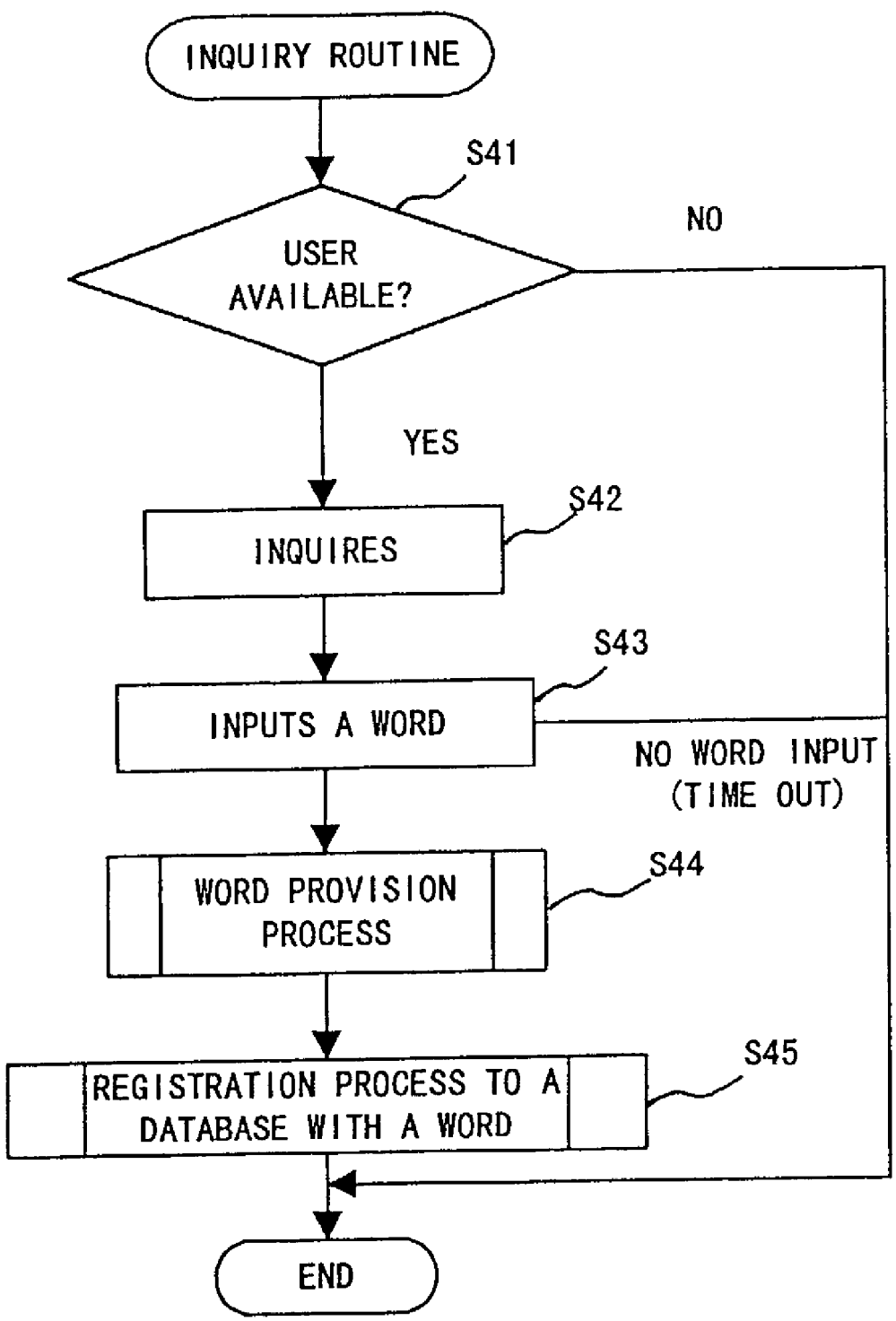

The word provision unit 5 attaches a word to data groups in the database with no word 7 in which the data reach a certain volume. FIGS. 10A and 10B are flowcharts showing the processes of the word provision unit 5. As sensor data are input, the composing data number of a data group in the database with no word 7 increases gradually. When the data number exceeds a certain volume β, the data group is provided with an appropriate word. When attaching a word, for example, the word provision unit 5 inquires of a user what name should be attached to the data group by providing sensor data and indicating the state of the sensor data (in the case of a robot, the location of the robot).

Namely, as shown in FIG. 10A, the word provision unit 5 checks whether or not the element number $m_9$ of data groups of the first through k-th groups in the database with no word 7 is greater than a certain volume β (steps S31 to S34), and if the element number $m_9$ is greater than the certain volume β, the word provision unit 5 activates the inquiry routine shown in FIG. 10B (step S35).

In the inquiry routine the word provision unit 5 judges whether or not a user is at hand (step S41), and if a user is not available (step S41: NO), the word provision unit 5 terminates the process. If a user is available (step S41: YES), the word provision unit 5 inquires of the user (step S42), and requests the user to input a word for the sensor data (step S43). The word provision unit 5 attaches the input word to the data group (step S44), and registers the data group in the database with a word 6 (step S45). In the inquiry in step S42, for example, the contents of the data are indicated using such a user interface as shown in FIG. 11, and a word is input.

The details on this provision of a word are further described below. Although, when attaching a word, it is desirable to use a human language as much as possible, it is difficult to automatically attach such a name to data, unless the apparatus is provided with such knowledge in advance. Thus, a word is attached to the data group by the apparatus' appropriately inquiring of a user using the user interface shown in FIG. 11.

The apparatus presents the classification criteria and the data contents of data groups classified in advance, and requests a user to attach a word. For example, for Characteristic data of the rotating speed of a robot $\Delta\theta/\Delta t$, a classification criterion of $\Delta\theta/\Delta t>0$ can be used. Furthermore, since this is a time series characteristic, the advice "it is appropriate to attach a verb to this data group.", etc. is also given via the user interface.

The user attaches the word "turn" to the data group according to this classification criterion. In this case, although the words "turn left" are more appropriate for $\Delta\theta/\Delta t>0$, the user does not usually chose the word "left".

Then, when a classification criterion of $\Delta\theta/\Delta t<0$ is presented, the user tries to attach a word "turn" again. However, since the word "turn" is already used for another data group, the apparatus can suggest to the user that there are two kinds of data groups of both $\Delta\theta/\Delta t>0$ and $\Delta\theta/\Delta t<0$ by giving the advice "the word turn is already used for another data group with a characteristic of $\Delta\theta/\Delta t>0$". At this time, more precise words of "turn left" and "turn right" can be attached to data groups of $\Delta\theta/\Delta t>0$ and $\Delta\theta/\Delta t<0$, respectively.

Furthermore, since the apparatus can recognize that the user has tried to attach the same word to these two data groups, the apparatus can estimate that there is some relationship between these data groups. Thus, the apparatus can inquire of the user whether or not a word should be attached in order to further differentiate these data groups. At this moment, since at first the user has tried to attach the word "turn" to these two different data groups, it can also be estimated that this word is common to these data groups. Thus, the apparatus can inquire of the user whether or not to attach the word "turn" to these data groups. If the user replies OK to the inquiry, the word "turn!" is attached to these two data groups. Otherwise, the apparatus requests the user to attach another word to the data.

After this, the classification criteria for distinguishing these two data groups become $\Delta\theta/\Delta t>0$ and $\Delta\theta/\Delta t<0$.

If a user is not available, an appropriate code is attached, and is modified later by inquiring of a user, if needed. If a user is not at hand, an appropriate word is attached by the apparatus. Of course, no word can also be attached. Whether or not a user is at hand can be judged from the fact that there is a reply within a certain time after an inquiry is issued, or can be verified by using a sensor of infrared rays (an infrared sensor), etc..

Then, when it is found that a user is now at hand, the word provision unit 5 activates an inquiry unit for attaching a word to a data group about which an inquiry was not available, and requests the user to attach a word to the data group.

A data group with a word attached is then moved from the database with no word 7 to the database with a word 6, and stored there. Raw data stored in the database for raw data 9 are provided with a code from which it can be judged to which data group the raw data belong.

The characteristic data obtained in this way are classified and registered in the database with a word 6 in order.

Although the word provision unit 5 attaches a word using an appropriate user interface, the word provision unit 5 also attaches "noun", "verb", "adjective", etc. to the data group according to the characteristic of the data group. The criteria in this case are shown below.

(1) Provision of a Noun

Since the name of a thing indicates the static state of the thing, a noun is attached to data classified according to a static state, that is, not time-series data.

(2) Provision of a Verb

Since a verb indicates a change with the passage of time and an operation, a verb is attached to data classified according to a time-series characteristic.

(3) Provision of an Adjective

An adjective indicates the volume and property of a characteristic, that is, for example, "the operation is quick.", "the volume is large.", etc. Therefore, when there is characteristic data and the difference between properties is described, an adjective is used. Here, it is assumed that a robot moves, and $\Delta Dir/\Delta t$ indicates the characteristic data of a movement translation. If ΔDir/Δt obtained from one sensor signal series is larger than the ΔDir/Δt obtained from another sensor signal series, the former is called higher in speed than the latter. Conversely, the latter is called lower in speed than the former. Alternatively, if a certain threshold is provided and ΔDir/Δt is greater than this threshold, the word "high" can also be attached. If ΔDir/Δt is smaller than the threshold, the word "low" can also be attached.

Furthermore, a word can also be attached according to fuzzy logic. In this case, membership functions corresponding to "high", "normal" and "low" are defined, and one of "high", "ordinary" and "low" is selected according to the aggregate degree. In this case, not only ΔDir/Δt but also the definitions of the membership function are added as characteristic data.

(5) Status Judgement Unit

A status judgement unit 4 refers to both characteristic data during judgement and a word attached to a corresponding data group in the database with a word 6, and judges the current status from the contents. For example, if referring to a data group with the word "corridor" and judging that the current characteristic data correspond to the word "corridor", the status judgement unit 4 judges the state to be "in the corridor". That is, the status judgement unit 4 judges the status of input data by comparing the input data with data stored in the database with a word and further using the name attached to the word data.

Figure 12:
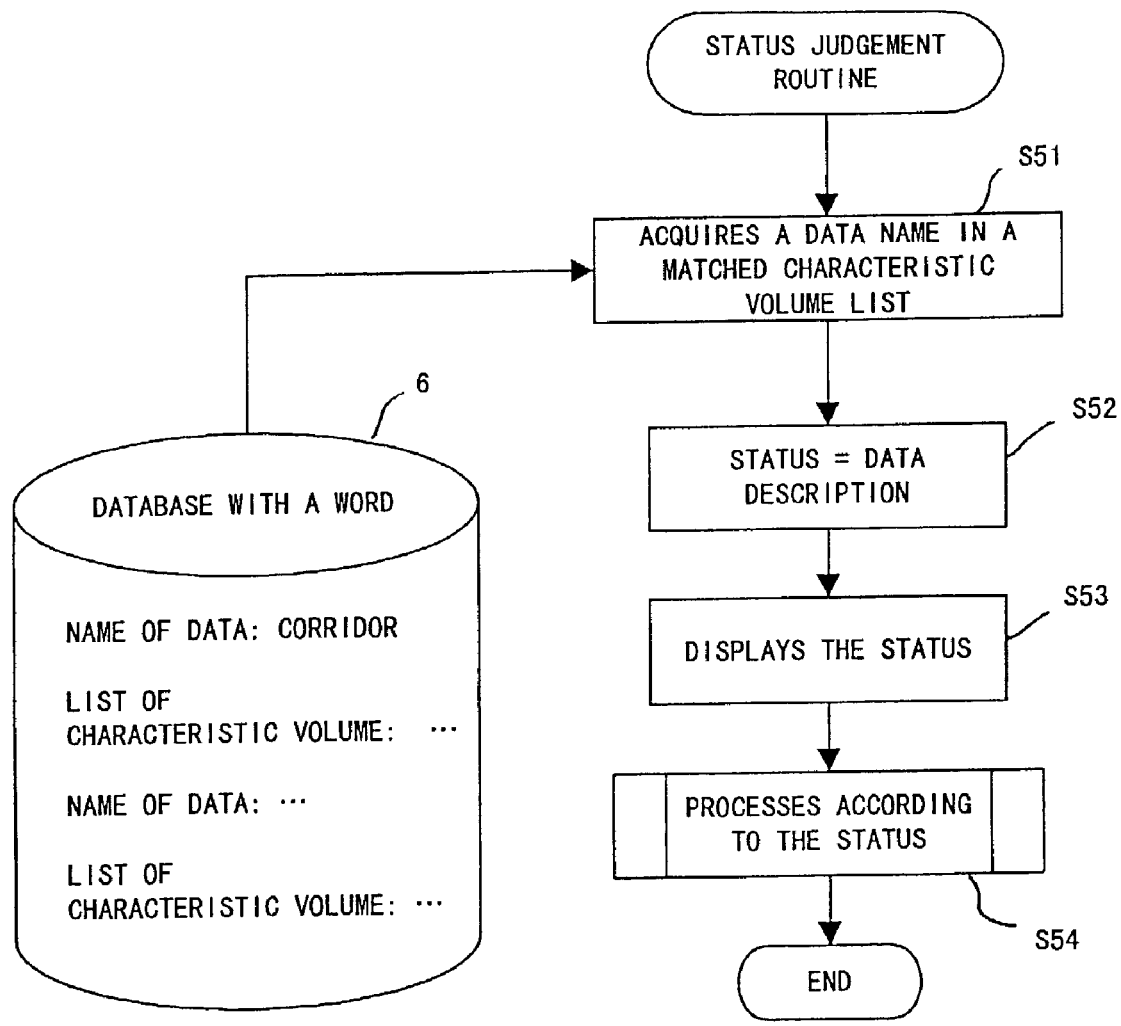
FIG. 12 is a flowchart of the status judgement unit.

FIG. 12 is a flowchart of the status judgement unit.

The status judgement unit 4 obtains the data name (word) of a matched characteristic data list from the database with a word 6 (step S51). The status judgement unit 4 indicates the current status by the obtained data name (step S52), and displays the status (step S53). The status judgement unit 4 executes processes corresponding to the status, if needed (step S54). For example, if the characteristic data of data obtained from the ultrasonic wave sensor of a robot is a "left corner", a control such as "after turning left 90 degrees, move forward.", etc. is performed.

(6) Data Group Deletion Unit

In the data stored in the database with no word 7, data which do not reach a predetermined number of pieces of data, even after a certain time elapses, have a good possibility of including an error due to some cause, such as noise, etc. Since such data cannot be called data with reliability sufficient to attach a word, the data are deleted, which is performed by a data group deletion unit 10. Alternatively, these data may have some peculiar property. In that case, the data do not have to be deleted.

(7) Database for Storing Raw Data

FIG. 13 shows the data format stored by the database for storing raw data 9.

The database for storing raw data 9 is a database for storing data obtained from the information input unit 1 as they are, and, as shown in FIG. 13, it stores the identification number of data automatically provided by a system, the acquisition time of data, the kind of a sensor and the contents of data. This example is configured so that both the kind of characteristic data and the characteristic data can be stored in the database for storing raw data 9. In the case of time-series sensor data too, the identification number of data, the acquisition time of data, the kind of a sensor and the contents of data are stored in the same way. Both the kind of characteristic data and the characteristic data can also be stored in the same way.

(8) Database with No Word/Database with a Word

FIG. 14A shows a data format of the database with no word.

The database with no word 7 stores the identification number of classified data groups, the number of pieces of data belonging to the group, a provisional word attached to the group, the provisional category of the word, the kind of characteristic data being a classification criterion, the criteria, and the identification number of data belonging to this group. The provisional word attached to the group and the provisional category of the word are automatically attached by the apparatus according to the status of the data.

FIG. 14B shows a data format of the database with a word.

The database with a word 6 registers data groups in the database with no word 7 which are provided with a word by the word provision unit 5. The data format is the same as that of the database with no word 7, but the database with a word 6 does not have a provisional word or a provisional category, but information on a word and a category attached by the word provision unit 5.

(9) Embodiment Using a Hierarchical Type Neural Network

Next, an example of extracting characteristics using a hierarchical neural network is described below. Although the characteristic extractor unit 2 can be implemented by using a general-purpose processor, the characteristic extractor unit 2 can also be implemented by using a neuro-computer of a hierarchical type neural network.

Figure 15:
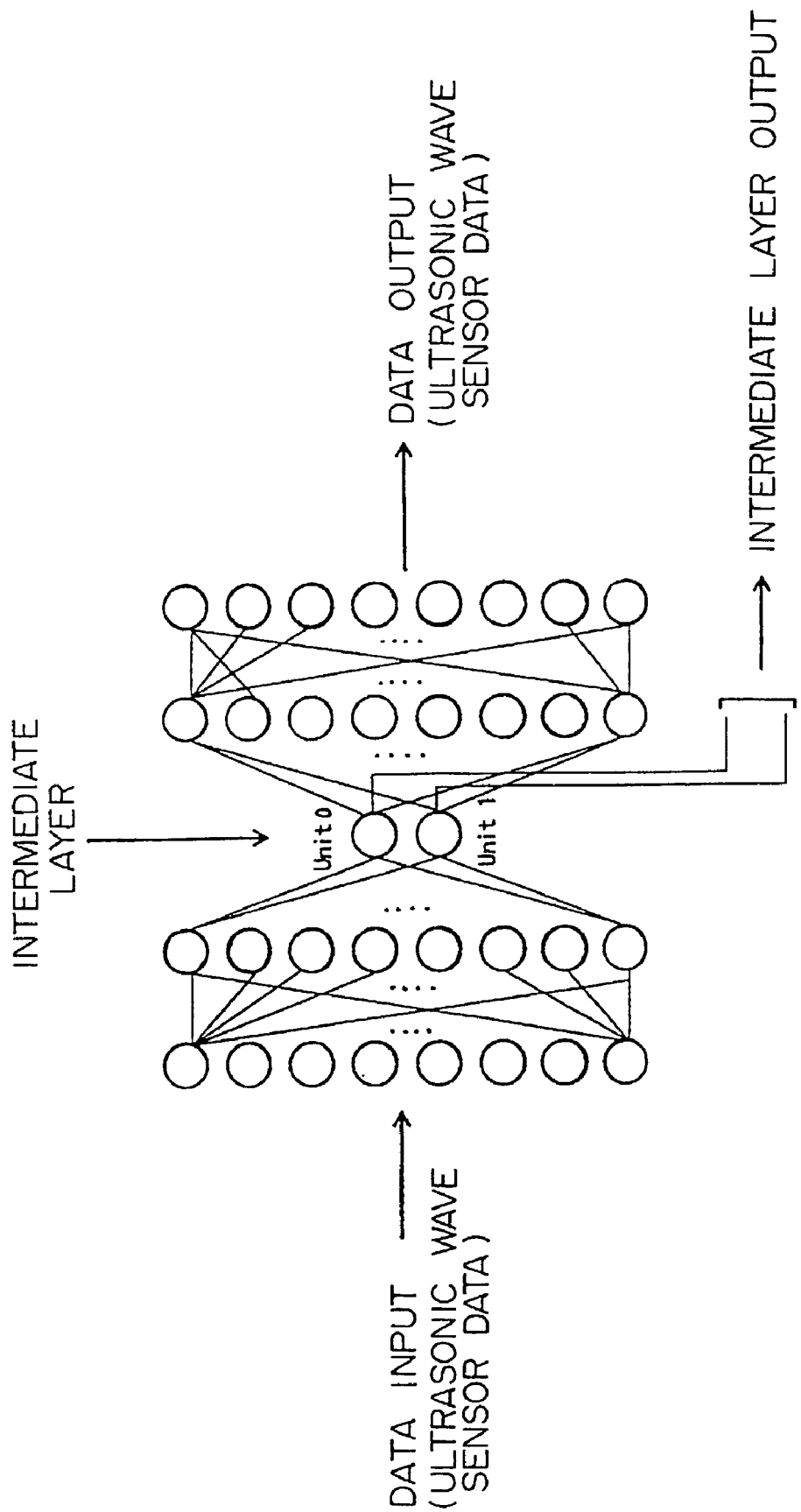
FIG. 15 shows an embodiment using a neural network.

FIG. 15 shows a method for extracting characteristics using five layers of a neural network.

This hierarchical type neural network is made to learn by providing teaching data so that an input value and an output value can become the same, that is, to learn an identity map. The robot 30 including 8 ultrasonic wave sensors 31 as shown in FIG. 6, is made to learn so that an input value and an output value can always be the same using 8 values from one ultrasonic wave sensor as the input to a neural network and 8 of the same ultrasonic wave sensor values as teaching data. In this case, the characteristic data of the data is the output of an intermediate layer of a neural network.

The output value of each unit of the neural network is adjusted to be ranged between ±1. Here, the output of the third layer is assumed to be used. Since, generally speaking, there are a plurality of intermediate layers, the characteristic data becomes a vector consisting of these outputs. In the example shown in FIG. 15, the output unit of the third layer consists of two units, and the output of each of these units (unit 0 and unit 1) becomes the characteristic data. The similarity between the characteristic data is calculated using the above-mentioned distance L.

Figure 16:
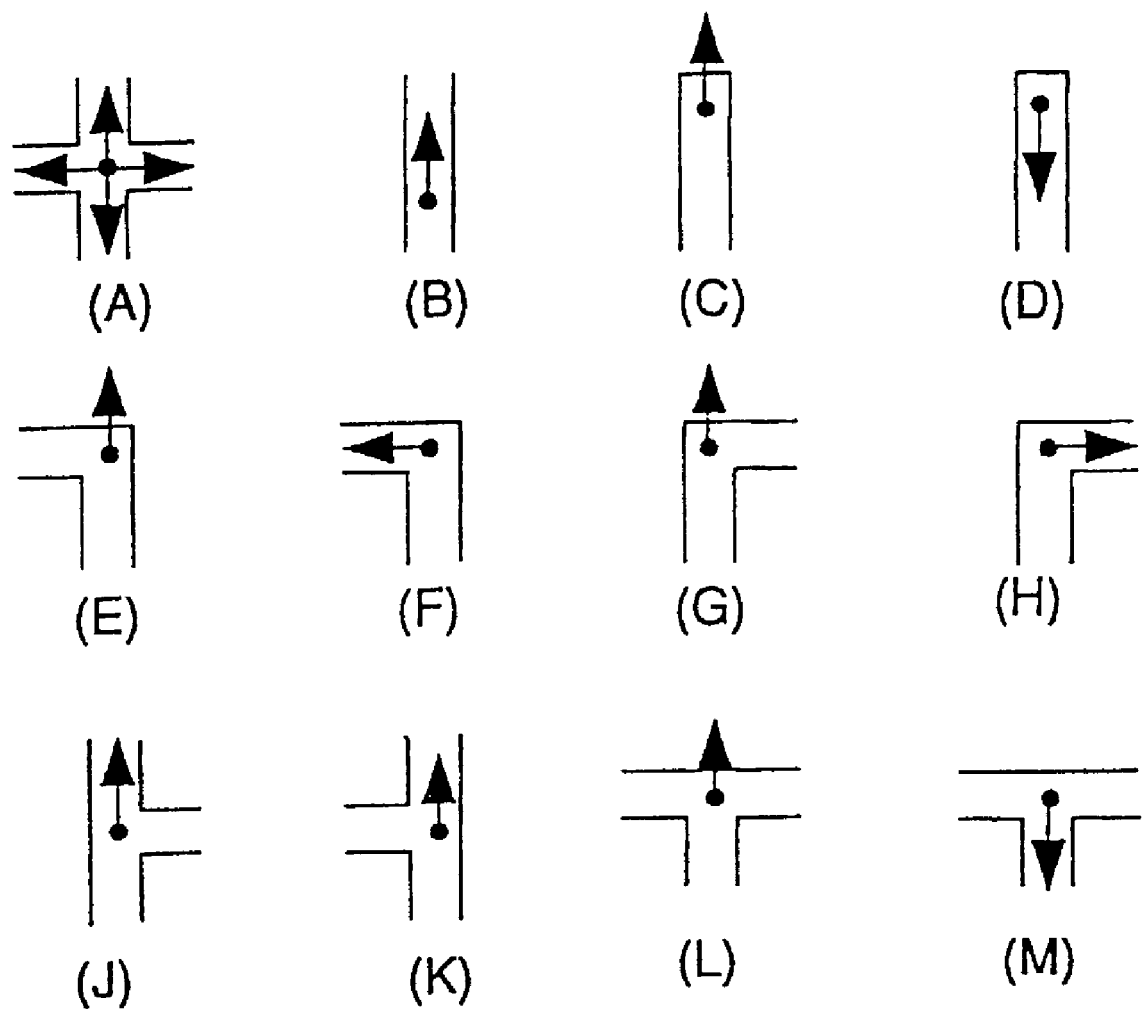
FIG. 16 shows an example of the characteristic extraction of sensor data.

FIG. 16 shows the state where the mobile robot shown in FIG. 6 is located at a variety of positions along a corridor (12 positions: (A) through (M)).

FIG. 17 shows the values of each of the 8 ultrasonic wave sensors mounted on the robot.

Figure 18:
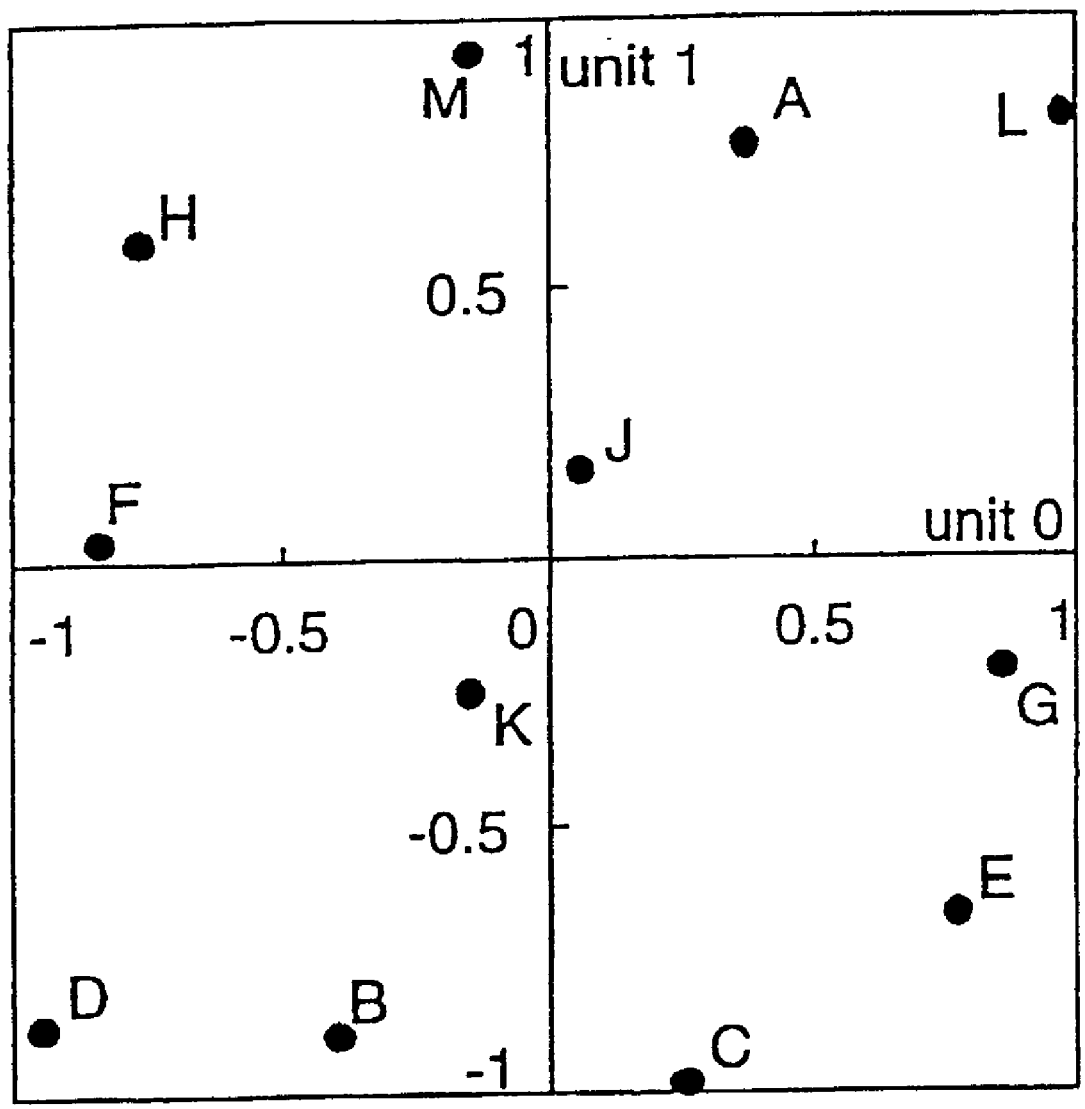
FIG. 18 shows an example of learning by a neural network.

FIG. 18 shows a plotting map indicating the 12 sets of data shown in FIG. 17 after learning by the neural network, in which the output values of unit 0 and unit 1 of the intermediate layer of the third layer are plotted along the horizontal and vertical axes, respectively. It is found from FIG. 18 that 12 kinds of sensor data are distributed appropriately. Therefore, data within the range of a certain distance, for example, 0.2 from each point, can be classified.

FIG. 19 shows the output values of each unit at that time.

Figure 20:
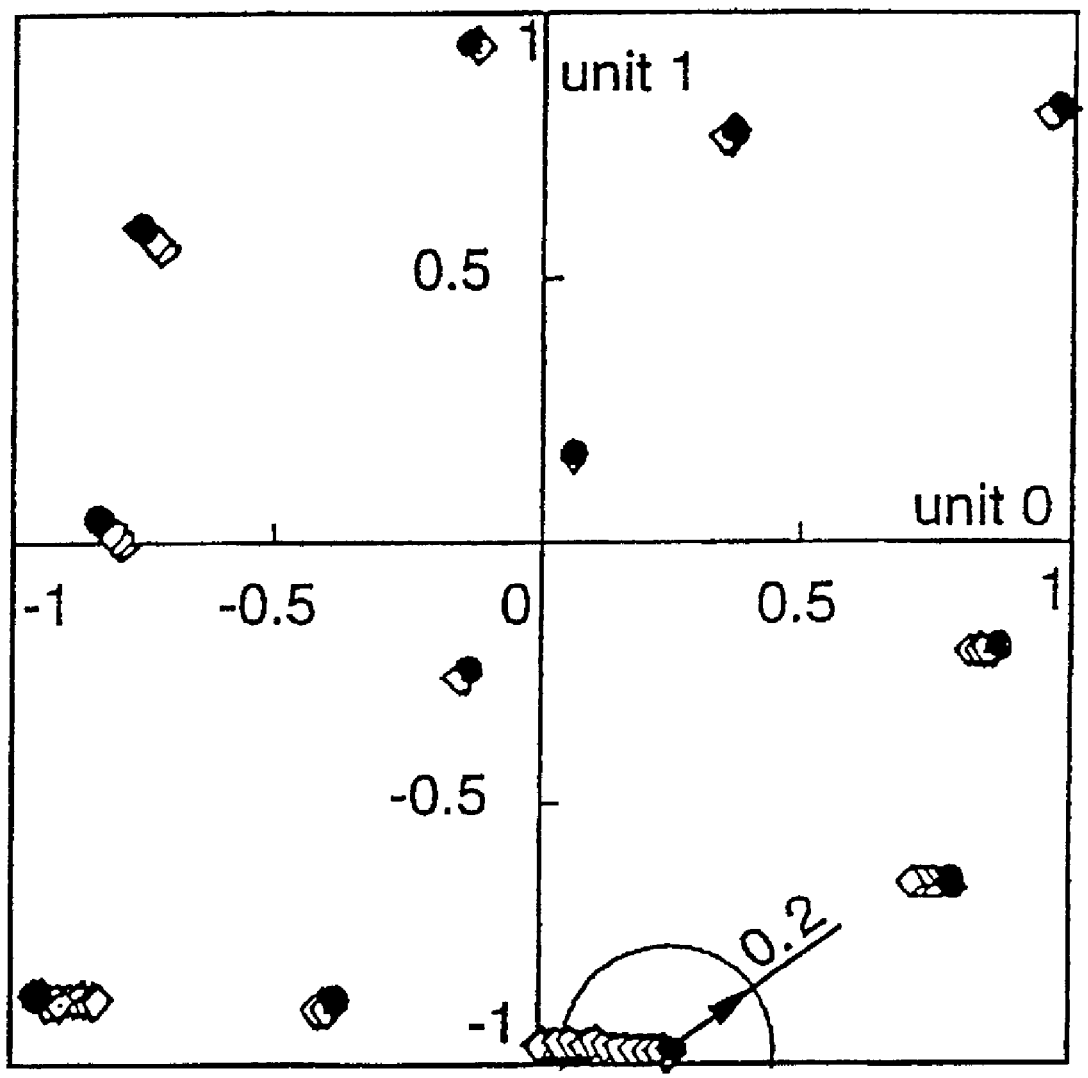
FIG. 20 shows a classification result by a neural network.

FIG. 20 shows a plotting map indicating the output data of the third layer in the same way as shown in FIG. 18. The output data is obtained from a pre-learnt neural network according to the input data of the pre-learnt neural network, which are the ultrasonic wave sensor data obtained when the robot moves in the corridor shown in FIG. 6. Outputs corresponding to the learnt data and newly classified data are indicated by a black point (●) and a diamond mark (◇), respectively. As a result, target data for classification are found within a distance of 0.2 except for a part of data. Therefore, a status judgement can be performed using a name attached to the learnt data, for example, "crossroads" for (A), "corridor" for (B), etc.

In this embodiment, since data to be stored in the database with a word 6 (corresponding to the original 12 sets of data) are designated in advance by a user and the words are also attached, both an efficient word setting and status judgement are available.

(10) When Time-series Data are Used as Characteristic Data

Next, an embodiment in the case where time-series data are used as characteristic data is described below with reference to an example where a mobile robot moves. A mobile robot usually has two kinds of motors for both a forward/backward movement and a rotation (or steering). These two motors are provided with sensors for detecting their rotation, for example, an encoder. Under these circumstances, the robot is moved by orders, and the locations of the robot during movement are measured in sequence.

Since, when the motor for forward/backward movement drives, a value of the encoder changes, the status change is detected. That is, the status change of the encoder is extracted as characteristic data by the characteristic extractor unit 2. This characteristic data can be set according to the forward/backward direction of the movement, that is, the codes of "+" for forward and "−" for backward. The rate of change, that is, a speed, can also be detected as characteristic data. That is, the characteristic data obtained are data of the speed and the code.

The speed and code data are transmitted to the characteristic comparison/classification unit 3. The speed and code data are compared with data groups relating to speed and direction with reference to the database with a word 6. Then, a word is attached so that the word of "forward" or "backward" can be selected according to the code of "+" or "−", respectively. Then, the status judgement of a forward/backward movement is available.

The detailed description is as follows. Since the location data of the robot changes as the robot moves, the location data are obtained in a time-series. If the obtained data groups are assumed to be S1, . . . , Sn, these are time-series data obtained at certain intervals of Δt. Here, a differential ΔS between each item of data is studied.

$$\Delta S_i = (S_i - S_{i-1})/\Delta t \; i=1, \ldots, n$$

where $\Delta S_i$ indicates how much the location of the robot changes in $\Delta t$. The data are classified according to the classification method described earlier using this as characteristic data. The posture of the robot is also taken into consideration, and the elements of S are assumed to be x, y and θ. x and y indicate movement amount in a two-dimensional plane of the robot, and θ indicates the rotation amount of the robot. ΔS indicates the state of rotation when only θ changes, and indicates a position translation when only x and y change. That is, if similar data are selected according to a criterion of Δθ>0, this can be judged as "during turning left", and for example, the data aggregate is named "turn left". If Δθ<0, the data aggregate is named "turn right".

Next, the case where Δθ=0 is studied. In this case, the moving direction of the robot is indicated by Dir=ATAN (y/x), and it can be judged that, if the moving direction Dir indicates the direction in the front of the robot, the robot is in a state of "moving forward", while if Dir indicates the direction in the rear of the robot, the robot is in a state of "moving backward". If Δθ=0, Δx=0 and Δy=0, the robot is halted, and if both Δx and Δy have certain values, the robot rotates while translating, that is, turns in a curve.

Similarities between data are calculated in the above-mentioned way, and if a similarity is found between two set of data, a certain kind of flag is attached to the data. This flag is attached so that those data can be judged to belong to the same group when being detected. If similarity is not found, another flag different from that of the characteristic data first obtained is attached.

In this way, every time sensor data are input, characteristic data is extracted, classified and stored.

Although embodiments where the present invention applies to a mobile robot are mainly described so far, the present invention is not limited to a mobile robot, but can also be applied to a system for executing some process or judgement using an input from a sensor.

Figure 21:
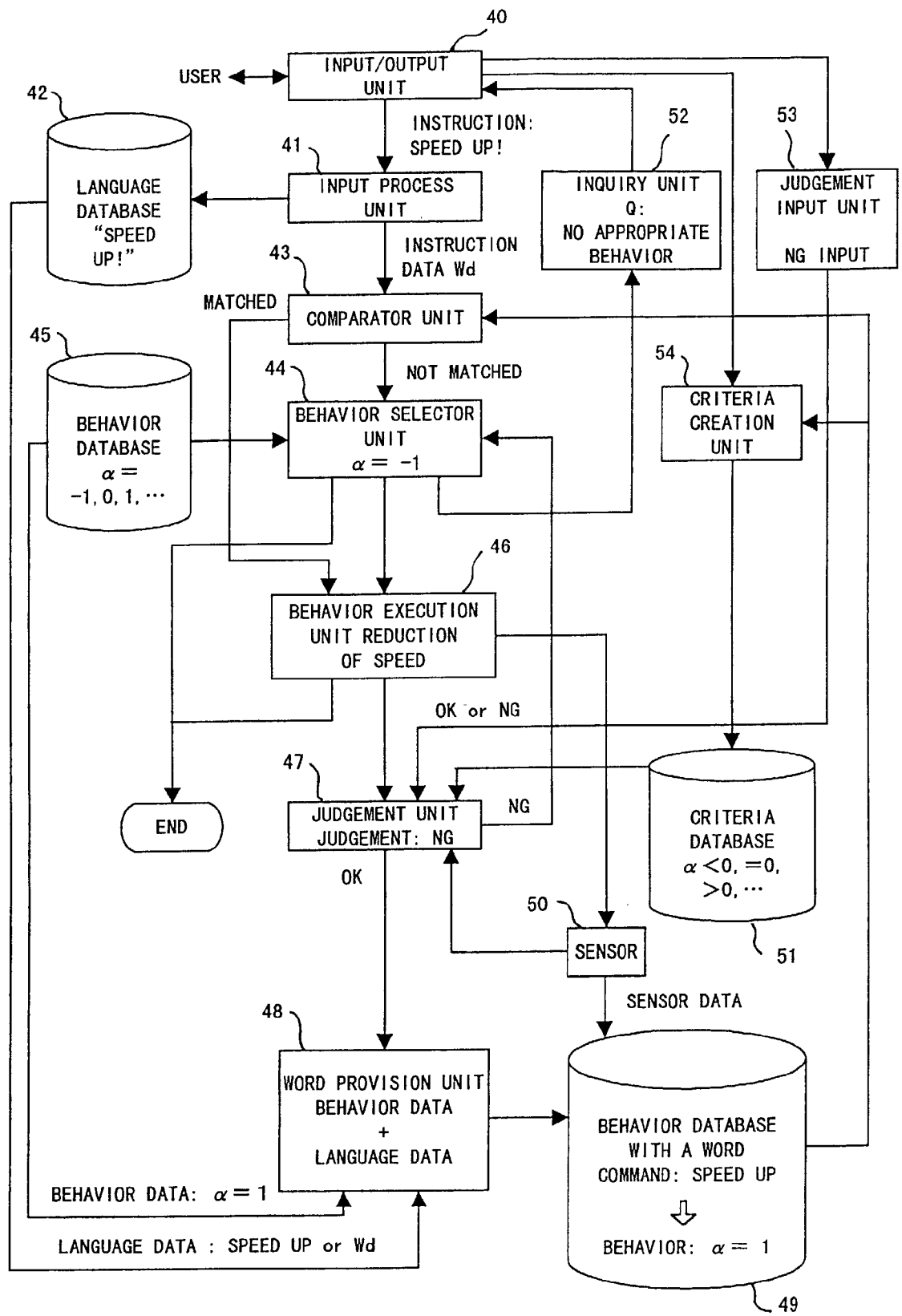
FIG. 21 explains an embodiment of a device operation apparatus including the language process interface according to the present invention.

2. Device Operation Apparatus with a Language Process Interface of the Present Invention Next, a device operation apparatus with the language process interface of the present invention is described with reference to FIG. 21.

Here, the description is made taking an example of the process in the case where a user gives an instruction "speed up!" to a mobile robot.

When words are issued by a user, the voice data are received by an input/output unit 40 such as a microphone, etc., and transmitted to a computer. In the computer an input process unit 41 processes the data. In the case of voice data the input process unit 41 stores the characteristics of the voice, for example, a power spectrum for each band, a voiceprint, etc. in a language database 42. The name of the stored data is assumed to be Wd. Wd is compared with behavior data stored in the database with a word 49.

In the case of a voiceprint the similarity of the voiceprint is compared using a distance between voiceprints. As a result of the comparison, if there is no matching or if there are no data in the behavior database with a word 49, a behavior selector unit 44 is activated. If there is a matching, a word is selected from the behavior database with a word 49, and combined behaviors are executed.

For example, if a behavior matching with an instruction "speed up!" is acceleration α=1 (meters/second$^2$), this behavior is selected and executed, and the speed gradually increases. As a result of the comparison, if there is no matching, the behavior selector unit 44 is activated, and appropriate behavior data are selected out of behavior data stored in the behavior database 45, such as acceleration α=−1 (meter/second$^2$), acceleration α=0 (meter/second$^2$), acceleration α=1 (meter/second$^2$), etc.

Behavior data can be selected out of behavior data in the behavior database 45 in sequence from the top or at random. Here, behavior data are assumed to be selected in sequence from the top. First, acceleration α=−1 (meter/second$^2$) is selected. When this behavior is executed, the robot moves more slowly or backward. Since this is contrary to the instruction "Speed up!" issued by the user, the user inputs NG. Then, this behavior is cancelled, and the process restores to the state before starting a new behavior or the operation stops. Then, a behavior different from the previous behavior, acceleration α=0 (meter/second²) is selected and executed. By this the speed becomes constant. Since this is also contrary to the issued instruction, the user inputs NG this time too. Then, a next behavior, acceleration α=1 (meter/second²) is selected and executed. Then, the speed gradually increases, and the user inputs OK.

The okayed behavior, acceleration α=1 (meter/second²) and the issued instruction "speed up!" are combined by the word provision unit 48, and using data such as "instruction: speed up!→Behavior: acceleration α=1 (meter/second²)," or data name Wd, data "instruction: Wd→behavior: acceleration α=1 (meter/second²)" are created and stored in the behavior database with a word 49.

By the above-mentioned procedures an instruction "speed up!" and a correct behavior "acceleration α=1" (meter/second²)" can be combined.

The process in the case where an instruction which is similar in meaning to, but different in words from an instruction "speed up!", for example, an instruction "at a higher speed!" is issued, is described below. Currently, data "instruction: speed up!→behavior: acceleration α=1 (meter/second²)" are assumed to be stored in the behavior database with a word 49. When an instruction "at a higher speed!" is issued, a data comparison is performed. However, since there is no matching data, a behavior selection is performed. At this time, since the behavior selection and judgement starts from α=−1 in order, and finally at α=1 OK is obtained, the instruction "at a higher speed!" is also combined with α=1, and data "instruction: at a higher speed!→behavior: acceleration α=1 (meter/second²)" are stored in the behavior database with a word 49. Thus, two sets of instruction data are stored in the behavior database with a word 49.

On the other hand, when an instruction "turn!" is issued, if there is no behavior pattern relating to a rotation in the behavior database 45, no favorable judgement can be obtained, even if all behaviors are tried. In this case, since finally nothing is OK, even if all accelerations are tried, an inquiry is issued to a user through the inquiry unit 52. For example, such an inquiry as "There is no appropriate behavior. Designate an appropriate behavior!" is issued.

In this case, this inquiry can be handled by adding such a behavior pattern as rotation speed=1 rad/second to the behavior database 45.

Alternatively, speed data at the time of behavior execution can be obtained in advance by a sensor 50, and the change patterns can be stored together with the behavior, or only patterns of sensor data can be stored together with the instruction in the behavior database with a word 49. In this case, since, when a certain instruction is issued, a user can understand how the state of the apparatus changes by the presentation of the pattern of the sensor data of a behavior matching with the instruction, a user can freely issue an instruction.

If instructions are issued in sequence in this way, a variety of relationships between words and behaviors regarding the increase and decrease of speed can be built up, and thereby human instructions in a variety of patterns can be handled.

Each unit executes the following processes.

Figure 22:
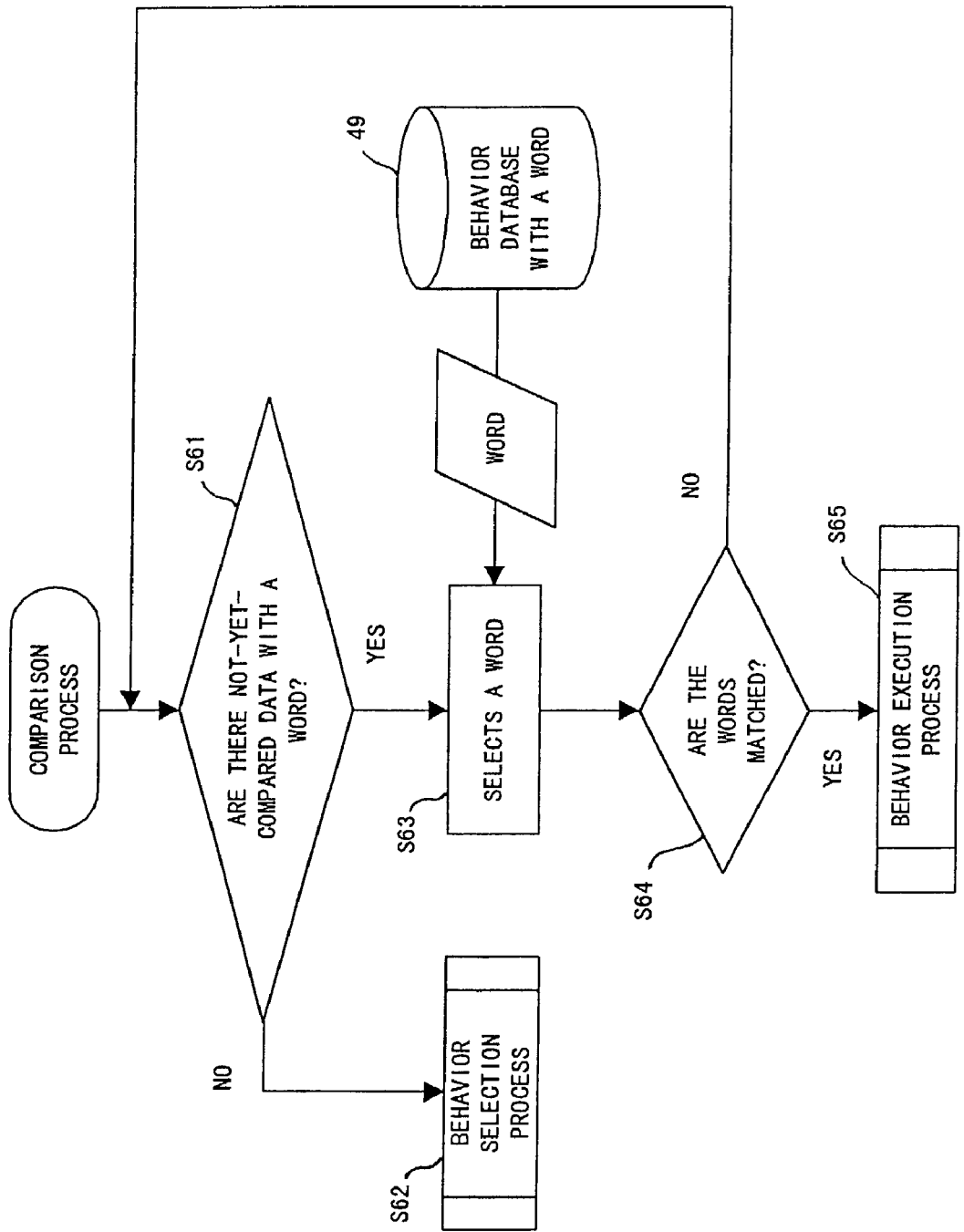
FIG. 22 is a flowchart of the comparator unit.

FIG. 22 is a flowchart of the process of the comparator unit 43.

When there are no data with a word which are not yet compared with an input word in the behavior database with a word 49, that is, when as a result of the comparison in the succeeding steps S63 and S64 (step S61), data with a word corresponding to the input word are not obtained, the comparator unit 43 activates the behavior selector unit 44, and requests a behavior selection process (step S62). If there are not-yet-compared data with a word in the database with a word 49, the comparator unit 43 selects a not-yet-compared word (instruction) from the database with a word 49 (step S63), and checks whether or not the word matches with the input word (step S64). If the words match with each other, the comparator unit 43 activates the behavior execution unit 46 to request a behavior execution process (step S65). If the words do not match with each other, the flow returns to step S61 and the comparison is repeated.

Figure 23:
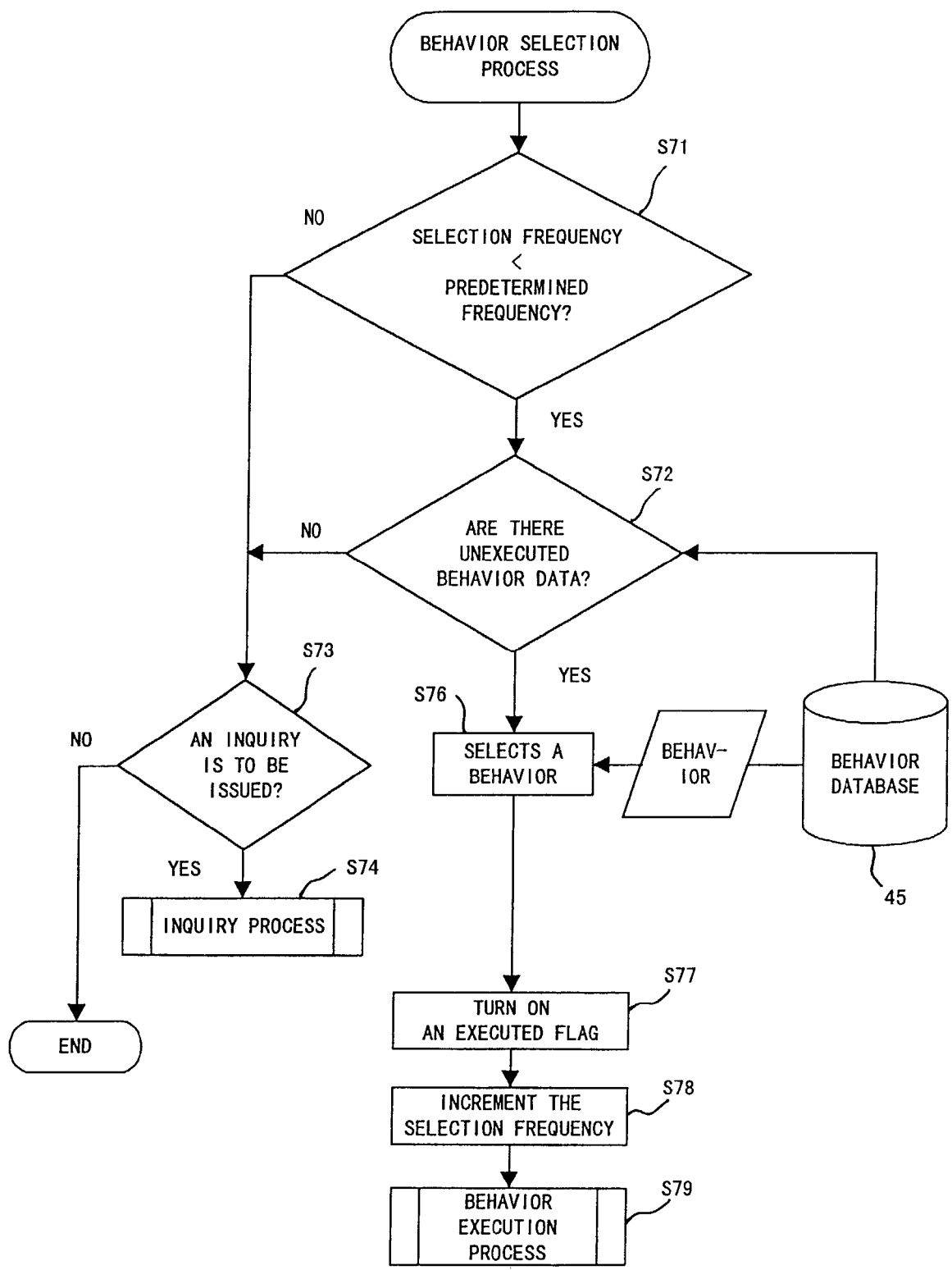
FIG. 23 is a flowchart of the behavior selection unit.

FIG. 23 is a flowchart of the process of the behavior selector unit 44.

The behavior selector unit 44 checks whether or not the behavior selection frequency so far reaches a predetermined frequency (step S71), and if the frequency reaches the predetermined frequency, the flow proceeds to step S73. If not, the behavior selector unit 44 checks whether or not there are unexecuted behavior data in the behavior database 45 (step S72), and if not, the flow proceeds to step S73. If there are unexecuted behavior data in the behavior database 45, the flow proceeds to step S76.

When the selection frequency reaches the predetermined frequency or when all behaviors in the behavior database 45 are executed, the behavior selector unit 44 judges whether or not an inquiry should be issued (step S73). If an inquiry is issued, the behavior selector unit 44 activates the inquiry unit 52, and performs an inquiry process (step S74), while, if not, the behavior selector unit 44 terminates the process.

On the other hand, if the selection frequency does not reach the predetermined frequency, and there are still unexecuted behavior data in the behavior database 45, the behavior selector unit 44 selects an unexecuted behavior (step S76), and turns ON the executed flag of the selected behavior (step S77). Then, the behavior selector unit 44 increments the selection frequency by 1 (step S78), activates the behavior execution unit 46, and requests the execution of the selected behavior (step S79).

Figure 24:
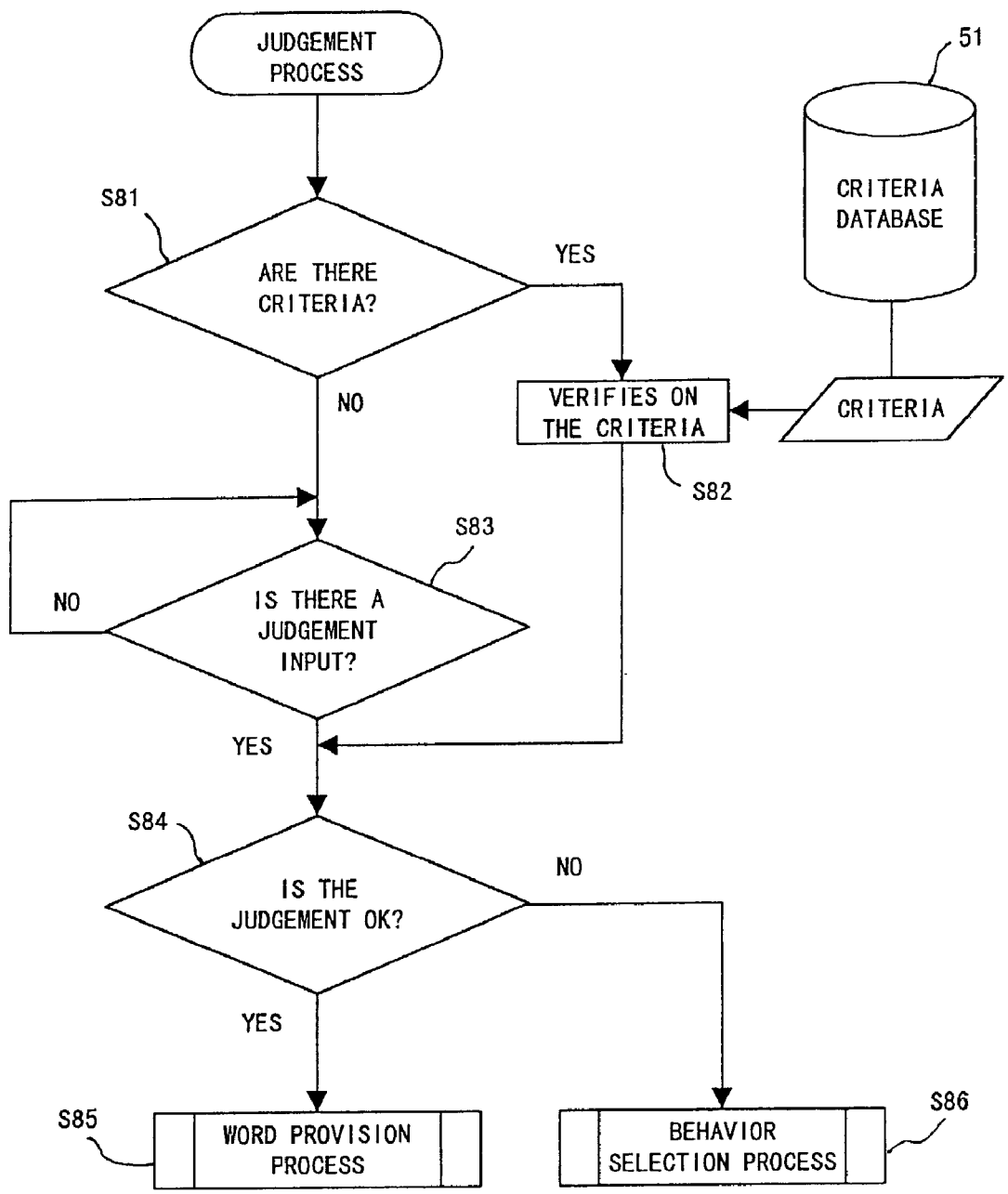
FIG. 24 is a flowchart of the judgement unit.

FIG. 24 is a flowchart of the process of the judgement unit 47.

The judgement unit 47 checks whether or not there are criteria in the criteria database 51 (step S81). If there are criteria, it extracts the criteria from the criteria database 51 and verifies input data according to the criteria (step S82). If not, the judgement unit 47 waits for a judgement input from the judgement input unit 53 (step S83).

As a result of the comparison and judgement input, if the judgement is OK (step S84), the judgement unit 47 activates the word provision unit 48 and requests a word provision process (step S85). If not, the judgement unit 47 activates the behavior selector unit 44 and requests a behavior selection process (step S86).

As described above, according to the present invention, since for the process of sensor data both a mechanism for classifying and storing input data from sensors and a mechanism for providing these classified data groups with appropriate words are provided, the status and state of the current location from the obtained sensor data can be correctly judged. Since enormous amounts of data are efficiently simplified and stored, and can be extracted and compared, if a status judgement is needed, better technology for the use of data can also be provided.

According to the present invention, a variety of instructions from users can be used, because a mechanism for selecting and executing behavior patterns appropriate for the instructions spoken by the users and a mechanism for combining and storing those behavior patterns and the instructions are provided. In addition, since an interface easy for users to understand is provided, a device operation apparatus with a better language process interface can be configured.

What is claimed is:

1. A device for operating an apparatus by processing language information, comprising:

a database storing behavior patterns of said apparatus to which words are attached;

input processing means for inputting a word indicating an operation of said apparatus;

comparing means for comparing the word input by said input processing means and a word attached to a behavior pattern stored in said database;

behavior selecting means for selecting a behavior pattern from a plurality of behavior patterns available for said apparatus according to a predetermined rule or at random if the input word does not match the word attached to the selected behavior pattern;

behavior executing means for automatically controlling said apparatus according to one of the behavior patterns to which a matching is detected by said comparing means and the behavior pattern is selected by said behavior selecting means;

judging means for judging whether or not the behavior pattern executed by said behavior executing means is appropriate; and word attaching means for attaching said word input by said input processing means to the behavior pattern judged to be appropriate by said judging means, and storing the behavior pattern in said database.

2. The device according to claim 1, wherein said input processing means converts an input word into a word of internal data by way of language processing.

3. The device according to claim 1, wherein said behavior selecting means selects a behavior pattern at random when a word is input;

said behavior executing means executes a predetermined number of or all possible behavior patterns; and said word attaching means attaches said word to a behavior pattern which obtains the highest evaluation of a certain criterion based on a result of an execution of a behavior pattern.

4. The device according to claim 1, further comprising:

criteria database storing criteria for use in judging by said judging means;

inquiring means for inquiring which criterion is to be used when a behavior is selected by said behavior selecting means; and judgement inputting means for inputting information on a suitability of a behavior pattern executed by said behavior executing means;

wherein said judging means judges a behavior based on one of the criterion obtained by said inquiring means and the information input from said judgement inputting means.

5. The device according to claim 1, further comprising: a plurality of sensors for measuring an operation status of a behavior pattern executed by said behavior executing means, wherein said word attaching means stores sensor data groups obtained from said sensor, said word, and a criterion used in a judgement by said judging means while executing the behavior pattern judged to be appropriate by said judging means.

6. The device according to claim 5, wherein said judging means uses a characteristic of sensor data as a criterion.

7. The device according to claim 1, further comprising: inquiring means for inquiring of a user an appropriate behavior pattern when an evaluation higher than a predetermined level cannot be obtained by said judging means after said behavior executing means executes a predetermined number of behavior patterns.

8. A computer-readable storage medium for storing programs for implementing a device operation method for processing data with a word used in a device for operating an apparatus by processing language information, said device operation method comprising the steps of:

inputting a word for instructing an operation of said apparatus;

comparing the input word and a word attached to a behavior pattern stored in a database;

controlling said apparatus based on the behavior pattern to which the word is attached if the input word matches the word attached to the behavior pattern; and controlling said apparatus according to a behavior pattern selected from a plurality of behavior patterns available for said apparatus according to a predetermined rule or at random if the input word does not match the word attached to the behavior pattern, and when an appropriate behavior pattern is executed, attaching said input word to the appropriate behavior pattern and storing the appropriate behavior pattern in said database with said input word.

9. A method for controlling an apparatus in response to human language commands, comprising:

storing operating information representing a behavior pattern of the apparatus and at least one corresponding word;

receiving a command for operation of the apparatus;

controlling the apparatus based on the behavior pattern if the command matches the at least one corresponding word;

automatically controlling the apparatus according to one of a plurality of available behavior patterns for the apparatus according to one of a predetermined rule and at random, if the command does not match the at least one corresponding word; and storing an appropriate behavior pattern and the command as additional operating information when the appropriate behavior pattern is selected from the plurality of available behavior patterns.

* * * * *

UNITED STATES PATENT AND TRADEMARK OFFICE
CERTIFICATE OF CORRECTION

PATENT NO. : 7,143,045 B2
APPLICATION NO. : 10/246637
DATED : November 28, 2006
INVENTOR(S) : Minoru Sekiguchi It is certified that error appears in the above-identified patent and that said Letters Patent is hereby corrected as shown below:

On Title page item 57, column 2, replace the Abstract with the following:

--Status indicated by sensor data of a device, etc., may be analyzed based on an expression in a natural language, and the device, etc., may be operated based on an instruction in a natural language by associating data with a word. Data groups obtained by classifying input as received from a sensor or after processing the sensor input, are stored in a database 6 and a word is attached to each of the data groups. A characteristic is extracted from the sensor input by a characteristic extractor unit, and then the sensor input is classified by a characteristic comparison/classification unit using the database. If the sensor input does not belong to any of the data groups in the database, the sensor input is temporarily stored in another database without an attached word. Subsequently, a word is attached to the classified data group(s) in the other database by a word provision unit, and the data groups are stored in the database that includes attached words.--

Column 23, Line 14, after "for" insert --automatically--.

Signed and Sealed this

Twenty-seventh Day of March, 2007

JON W. DUDAS
*Director of the United States Patent and Trademark Office*